US012650012B2

(12) United States Patent
Korcz et al.

(10) Patent No.: US 12,650,012 B2
(45) Date of Patent: Jun. 9, 2026

(54) BRACKET FOR DROP CEILING MOUNTING BRACE

(71) Applicant: Hubbell Incorporated, Shelton, CT (US)

(72) Inventors: Krzysztof Wojciech Korcz, Granger, IN (US); Victor Beristany, South Bend, IN (US); Krishna Patel, Granger, IN (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 18/891,543

(22) Filed: Sep. 20, 2024

(65) Prior Publication Data

US 2025/0092668 A1     Mar. 20, 2025

Related U.S. Application Data

(60) Provisional application No. 63/583,931, filed on Sep. 20, 2023.

(51) Int. Cl.
| | |
|---|---|
| *E04B 1/38* | (2006.01) |
| *E04B 2/02* | (2006.01) |
| *H02G 3/08* | (2006.01) |
| *H02G 3/12* | (2006.01) |

(52) U.S. Cl.
CPC ........ *E04B 1/388* (2023.08); *E04B 2001/389* (2023.08); *E04B 2002/025* (2013.01); *H02G 3/08* (2013.01); *H02G 3/125* (2013.01)

(58) Field of Classification Search
CPC .... H02G 3/08; H02G 3/125; E04B 2001/389; E04B 2002/025; E04B 9/006; E04B 1/388
See application file for complete search history.

(56) References Cited

U.S. PATENT DOCUMENTS

| | | | | |
|---|---|---|---|---|
| 5,823,482 A | * | 10/1998 | Gretz | ..................... H02G 3/123 174/54 |
| 6,341,466 B1 | * | 1/2002 | Kehoe | ..................... F16B 2/241 52/39 |
| 9,337,635 B2 | | 5/2016 | Korcz et al. | |
| 9,938,718 B1 | | 4/2018 | Underkofler et al. | |
| 2009/0250573 A1 | | 10/2009 | Nuernberger et al. | |
| 2013/0318905 A1 | | 12/2013 | Underkofler et al. | |

(Continued)

OTHER PUBLICATIONS

PCT/US2024/047702 International Search Report and Written Opinion dated Jan. 14, 2025.

*Primary Examiner* — Matthew P Travers
(74) *Attorney, Agent, or Firm* — Robinson + Cole LLP

(57) ABSTRACT

A bracket for mounting an electrical box to a brace includes a body portion with a first end, a second end, and a channel disposed between the first end and the second end that extends along a channel axis. A first foot extends from the first end in a direction substantially perpendicular to the channel axis. A second foot extends from the second end in a direction substantially perpendicular to the channel axis. A first tab extends from the channel in a first tab direction substantially perpendicular to the channel axis. The first foot and the second foot can be received within the electrical box and support a weight of the electrical box without any additional fasteners. The first tab is bendable to a second tab direction that is substantially perpendicular to the first tab direction and to the channel axis.

19 Claims, 27 Drawing Sheets

(56)        References Cited

U.S. PATENT DOCUMENTS

| 2017/0077689 | A1* | 3/2017 | Korcz | ................... | H02G 3/083 |
| 2021/0083465 | A1* | 3/2021 | Anderson | ................ | H02G 3/12 |
| 2021/0320485 | A1 | 10/2021 | Korcz et al. | | |

* cited by examiner

BRACKET FOR DROP CEILING MOUNTING BRACE

CROSS-REFERENCE TO RELATED APPLICATION

This application claims the benefit of U.S. Provisional Application No. 63/583,931, filed Sep. 20, 2023, the entire contents of which is incorporated herein by reference in its entirety.

FIELD

The present disclosure relates to a mounting brace assembly for an electrical box. More particularly, the present disclosure relates to a mounting brace shaped to allow for easy connection with a mounting bracket.

BACKGROUND

Ceiling fan and support braces for ceiling fans and luminaires are known for the support various outlet boxes. The braces are typically installed between supports such as trusses and joists in the ceiling or other overhead structures. Braces are also known for connecting to the bar supports used in suspended ceilings. Such braces can be awkward to install and may not provide the needed support for the intended device to be mounted to the electrical box.

SUMMARY

Various examples of the present disclosure can overcome various of the aforementioned and other disadvantages associated with known mounting assemblies and offer new advantages as well.

According to one aspect of various examples of the present disclosure, there is provided a mounting brace for supporting an electrical box above a ceiling. The mounting bracket is formed with a one-piece construction.

According to one aspect of various examples of the present disclosure, there is provided a mounting bracket for connecting to a mounting brace.

According to one aspect of various examples of the present disclosure, there is provided a bracket for mounting to an electrical box without additional fasteners.

According to one aspect of various examples of the present disclosure, there is provided a U-shaped bracket configured to receive a brace and couple to an electrical box without the use of fasteners.

According to one aspect of various examples of the present disclosure, there is provided a bracket configured to hook into an electrical box and support the weight of the electrical box without additional fasteners.

According to one aspect of various examples of the present disclosure, there is provided a bracket for mounting an electrical box to a brace. The bracket includes a body portion with a first end, a second end, and a channel disposed between the first end and the second end that extends along a channel axis. A first foot extends from the first end in a direction substantially perpendicular to the channel axis. A second foot extends from the second end in a direction substantially perpendicular to the channel axis. A first tab extends from the channel in a first tab direction substantially perpendicular to the channel axis. The first foot and the second foot can be received within the electrical box and support a weight of the electrical box without any additional fasteners. The first tab is bendable to a second tab direction that is substantially perpendicular to the first tab direction and to the channel axis.

According to one aspect of various examples of the present disclosure, there is provided a mounting assembly including an electrical box and a connection assembly. The electrical box includes a top surface that has a first mounting opening and a second mounting opening and at least one side surface that extends from the top surface and at least partially forming an internal volume. The connection assembly includes a first bracket and a second bracket. The first bracket includes a body portion with a first end and a second end. A first foot extends from the first end and a second foot extends from the second end in a substantially parallel direction to the first foot. A first tab is movable between a first direction substantially parallel to the first and second feet and a second direction substantially perpendicular to the first and second feet. The first foot of the first bracket is receivable within the first mounting opening and the second foot of the first bracket is receivable within the second mounting opening. The second bracket includes a body portion with a first end and a second end. A first foot extends from the first end and a second foot extends from the second end in a substantially parallel direction to the first foot. A first tab is movable between a first direction substantially parallel to the first and second feet and a second direction substantially perpendicular to the first and second feet. The first foot of the second bracket is receivable within the first mounting opening and the second foot of the second bracket is receivable within the second mounting opening. The first and second feet of the first bracket and the first and second feet of the second bracket can support a weight of the electrical box. The first tab of the first bracket can move from the first position to the second to contact the second bracket and the first tab of the second bracket can move from the first position to the second position to contact the first bracket. The first tab of the first bracket and the first tab of the second bracket can limit movement of the first bracket and the second bracket relative to one another.

According to one aspect of various examples of the present disclosure, there is provided a mounting assembly for connecting an electrical box to a mounting brace. The mounting assembly includes a first bracket portion that includes a body portion with a first end and a second end. A first foot extends from the first end and a second foot extends from the second end in a substantially parallel direction to the first foot. A first tab extends from the body in an opposite direction from the first and second feet. The first tab is oriented in a first direction substantially parallel to the first and second feet. The first foot of the first bracket can be received within a first mounting opening of the electrical box and the second foot of the first bracket can be received within a second mounting opening of the electrical box. The mounting assembly includes a second bracket portion that includes a body portion with a first end and a second end. A first foot extends from the first end and a second foot extends from the second end in a substantially parallel direction to the first foot. A first tab extending from the body in an opposite direction from the first and second feet. The first tab is oriented in a first direction substantially parallel to the first and second feet. The first foot of the second bracket can be received within the first mounting opening and the second foot of the second bracket can be received within the second mounting opening. The first and second feet of the first bracket and the first and second feet of the second bracket can support a weight of the electrical box. The first tab of the first bracket can contact a first rail of the mounting brace and the first tab of the second bracket can contact a second rail of the mounting brace. The first tab of the first bracket can sandwich the first rail between the first bracket and the electrical box with a first force. The first tab of the second bracket can sandwich the second rail between the second bracket and the electrical box with a second force.

According to one aspect of various examples of the present disclosure, there is provided a method of mounting an electrical box to a brace without the use of additional fasteners.

According to one aspect of various examples of the present disclosure, there is provided a method of mounting an electrical box to a brace. The method includes inserting a first bracket partially through an opening in the electrical box and inserting a second bracket partially through the opening. The method also includes pivoting the first bracket toward the second bracket so that the first bracket is substantially in contact with the second bracket.

According to one aspect of various examples of the present disclosure, there is provided a method of mounting an electrical box to a brace. The method includes positioning a first bracket substantially adjacent to a second bracket. The method further includes bending a first tab on the first bracket into contact with the second bracket and bending a second tab on the second bracket into contact with the first bracket.

According to one aspect of various examples of the present disclosure, there is provided a method of mounting an electrical box to a brace, the method comprising: positioning a first foot of a first bracket at least partially through a first mounting opening on a top surface of an electrical box and positioning a second foot of the first bracket at least partially through a second mounting opening on a top surface of the electrical box, wherein the first and second feet of the first bracket are substantially perpendicular with respect to a body of the first bracket, and wherein the first bracket is oriented at an oblique angle with respect to the top surface of the electrical box; positioning a first foot of a second bracket at least partially through the first mounting opening and positioning a second foot of the second bracket at least partially through the second mounting opening, wherein the first and second feet of the second bracket are substantially perpendicular with respect to a body of the second bracket, wherein the first bracket is oriented at an oblique angle with respect to the top surface of the electrical box, and wherein the first and second feet of the second bracket are oriented in an opposite direction as the first and second feet of the first bracket; moving the first bracket to a first mounted position where the body of the first bracket is substantially perpendicular to the top surface of the electrical box; and moving the second bracket to a second mounted position where the body of the second bracket is substantially perpendicular to the top surface of the electrical box; wherein the first and second feet of the first bracket and the first and second feet of the second bracket are configured to extend substantially parallel to an inner face of the top surface to support the weight of the electrical box.

According to one aspect of various examples of the present disclosure, there is provided a method of mounting an electrical box to a mounting brace, the method comprising: positioned the mounting brace on a top surface of the electrical box between a first mounting opening and a second mounting opening, the mounting brace having a first rail and a second rail; positioning a first bracket in a first initial position including positioning a first foot of the first bracket at least partially through the first mounting opening on the top surface of an electrical box and positioning a second foot of the first bracket at least partially through the second mounting opening on the top surface of the electrical box, wherein the first and second feet of the first bracket are substantially perpendicular with respect to a body of the first bracket, and wherein the first bracket is oriented at an oblique angle with respect to the top surface of the electrical box; positioning a second bracket in a second initial position including positioning a first foot of a second bracket at least partially through the first mounting opening and positioning a second foot of the second bracket at least partially through the second mounting opening, wherein the first and second feet of the second bracket are substantially perpendicular with respect to a body of the second bracket, wherein the first bracket is oriented at an oblique angle with respect to the top surface of the electrical box, and wherein the first and second feet of the second bracket are oriented in an opposite direction as the first and second feet of the first bracket; moving the first bracket from the first initial position to a first mounted position where the body of the first bracket is substantially perpendicular to the top surface of the electrical box; and moving the second bracket from the second initial position to a second mounted position where the body of the second bracket is substantially perpendicular to the top surface of the electrical box; applying a first force to the first rail via a first tab on the first bracket, wherein the first tab is spaced apart from the first rail in the first initial position and contacts the first rail in the first mounted position, wherein the first force increases as the first bracket moves from the first initial position to the first mounted position, and wherein the first tab of the first bracket sandwiches the first rail between the first bracket and the top surface; applying a second force to the second rail via a first tab on the second bracket, wherein the first tab is spaced apart from the second rail in the second initial position and contacts the second rail in the second mounted position, wherein the second force increases as the second bracket moves from the second initial position to the second mounted position, and wherein the first tab of the second bracket sandwiches the second rail between the second bracket and the top surface.

The disclosure herein should become evident to a person of ordinary skill in the art given the following enabling description and drawings. The drawings are for illustration purposes only and are not drawn to scale unless otherwise indicated. The drawings are not intended to limit the scope of the invention. The following enabling disclosure is directed to one of ordinary skill in the art and presupposes that those aspects within the ability of the ordinarily skilled artisan are understood and appreciated.

BRIEF DESCRIPTION OF THE DRAWINGS

Various aspects and advantageous features of the present disclosure will become more apparent to those of ordinary skill when described in the detailed description of preferred examples and reference to the accompany drawings.

DETAILED DESCRIPTION

Figure 1:
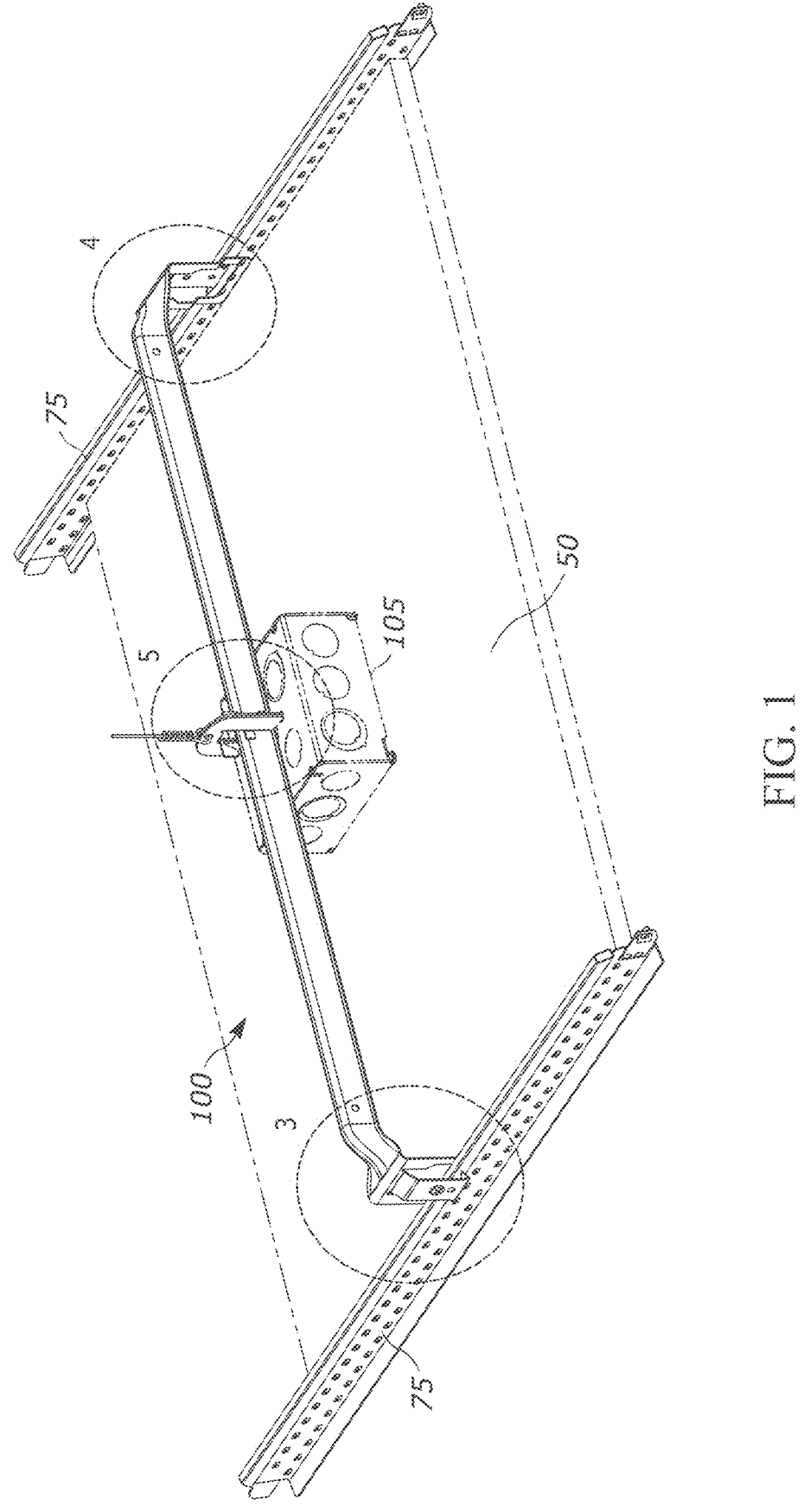
FIG. 1 shows a perspective view of a mounting brace supporting an electrical box and mounted to ceiling supports according to one example of the disclosure.
Figure 2:
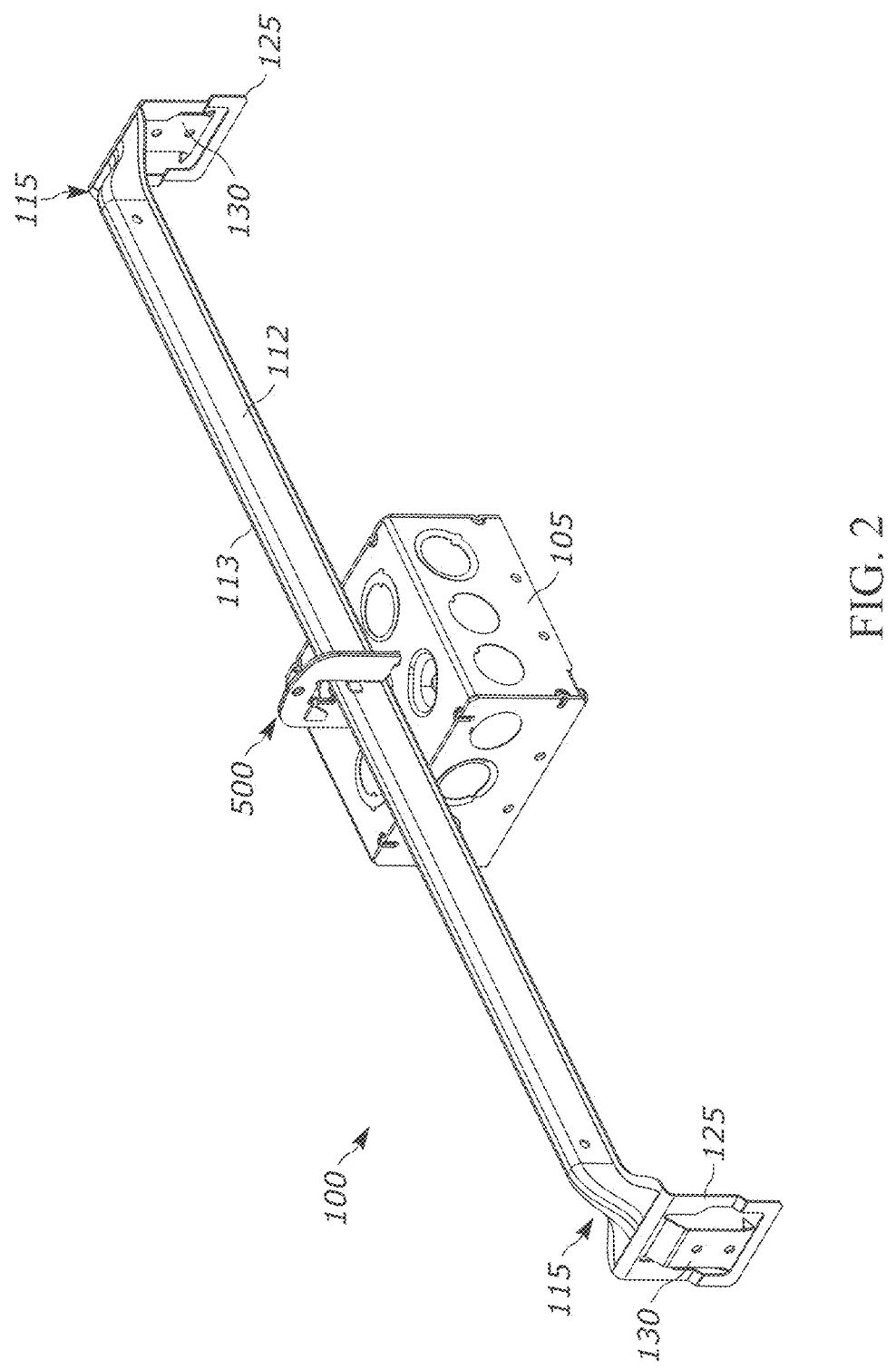
FIG. 2 shows a perspective view of the mounting brace supporting the electrical box of FIG. 1 when separate from the ceiling supports.

As shown in FIG. 1, a mounting brace 100 is installed in above ceiling 50 between a pair of ceiling supports 75. The mounting brace 100 is positioned so that it is substantially hidden to occupants in the room below. The mounting brace 100 supports an electrical box 105 that may be positioned proximate to an opening in the ceiling so that it can be at least partially visible in the room below.

Figure 6:
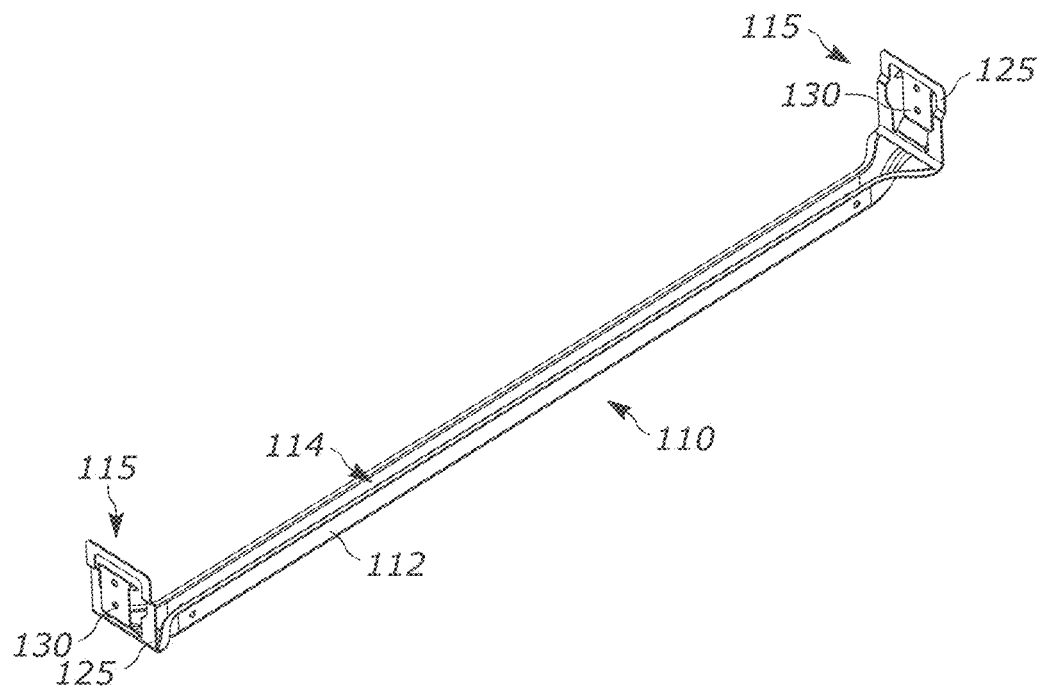
FIG. 6 shows a perspective view of the mounting brace of FIG. 1.
Figures 7, 8:
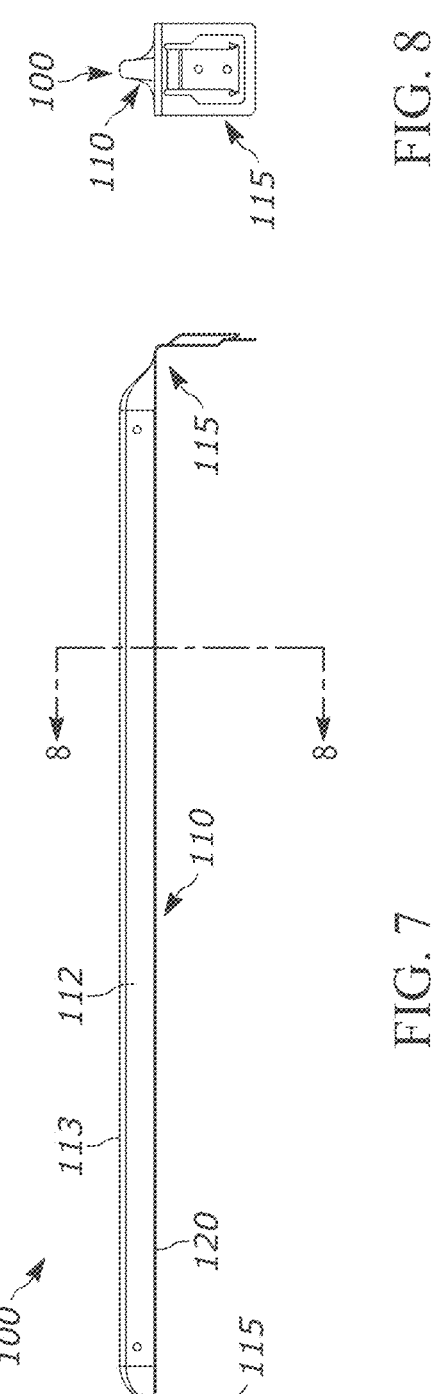
FIG. 7 shows a side view of the mounting brace of FIG. 6.
FIG. 8 shows a cross-sectional view of the mounting brace of FIG. 7, viewed along line 8-8.

As shown in FIGS. 6 to 8, the mounting brace 100 may be an elongated member. The mounting brace 100 may include a central body 110 and a pair of connecting ends 115. In the illustrated example, the central body 110 and the connecting ends 115 may be formed together as a unitary piece, although in other examples, the connecting ends 115 may be separate from the central body 110.

In the illustrated example, the central body 110 may be substantially U-shaped and include a pair of elongated surfaces 112 and a top surface 113. Each elongated surface 112 may be substantially perpendicular to the top surface 113, although other orientations may be used. A channel 114 is formed between the elongated surfaces 112 and the top surface 113 so that the center of the central body 110 is hollow. The top surface 113 may be substantially solid along its length (e.g., include no opening) so that the channel 114 is only accessible from underneath the central body 110.

In the illustrated example, the connecting ends 115 may be substantially perpendicular to the central body 110, although in other examples the connecting ends 115 may be oriented at different angles.

The central body 110 may include a rail 120 that extends substantially perpendicularly from the remainder of the central body 100 (although other examples may include a rail 120 that extends at a different angle). The rail 120 may extend substantially the entire length of the central body 110. The illustrated example includes a rail 120 on either side of the central body 110.

As shown in FIG. 8, each of the connecting ends 115 includes an outer section 125 and an inner section 130. The outer section 125 may have an inner perimeter and an outer perimeter. The outer perimeter may have substantially rectangular shape. The inner perimeter may have a different shape (although it may have a rectangular shape). The inner section 130 may extend from the outer perimeter and be formed as a cantilever shaped. In other words, the inner section 130 includes a fixed end 135 that extends from the outer perimeter and a free end 140 that is disposed within the inner perimeter. The free end 140 may be movable relative to the outer section 125.

Figure 9:
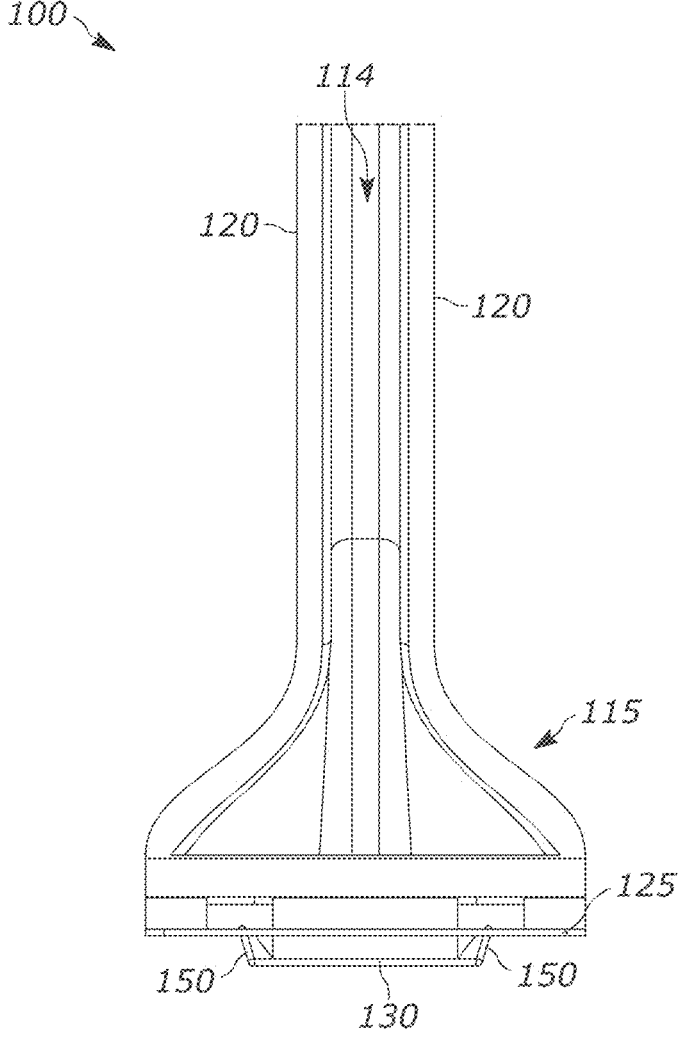
FIG. 9 shows a bottom view of a connection end of the mounting brace of FIG. 6.
Figure 10:
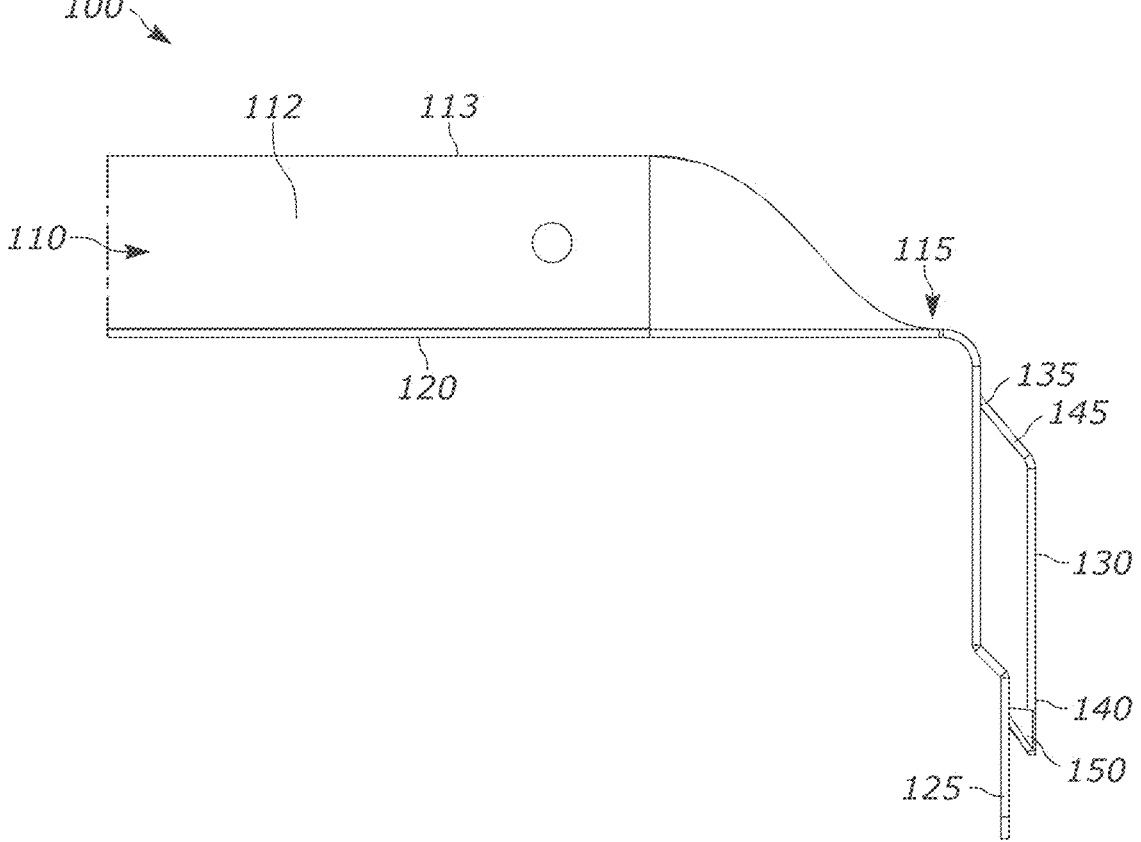
FIG. 10 shows a side view of the connection end of the mounting brace of FIG. 6 according to a first example.
Figure 11:
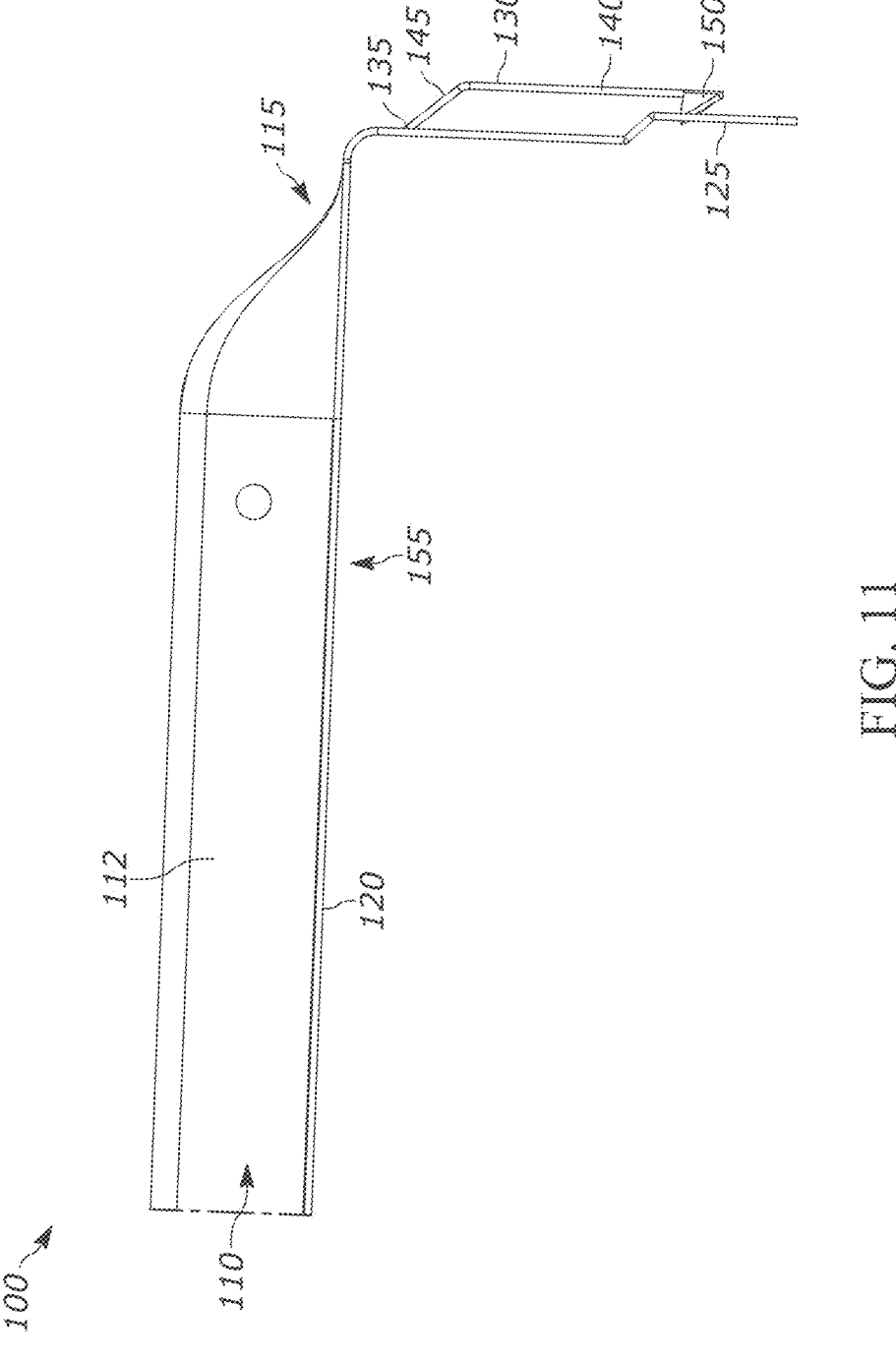
FIG. 11 shows a side view of the connection end of the mounting brace of FIG. 6 according to a second example.

As shown in FIGS. 9 to 11, the inner section 130 may axially extend from the outer section 125 (e.g., along an axis parallel to the central body 110). In other words, the inner section 130 is at least partially disposed on a different plane than the outer section 125.

With specific reference to FIGS. 10 and 11, the fixed end 135 extends from the outer section 125 in an inclined direction. The inner section 130 includes a transition 145 where the inner section 130 may become substantially parallel to the outer section 125, but on a separate plane (see e.g., FIG. 10). Alternatively, the inner section 130 may remain inclined relative to the outer section 125 after the transition 145 (see e.g., FIG. 11).

In certain forms, the inner section 130 may be bendable and may allow a user to adjust the angle of the transition 145, and thereby adjust the angle of the inner section 130 relative to the outer section 125.

Returning to FIG. 9, the free end 140 may include a pair of engaging elements 150. In the illustrated example, the engaging elements 150 may be formed at the edges of the free end 140. The engaging elements 150 may be bent inwardly (e.g., toward each other and toward the outer section 125). In certain forms, the engaging elements 150 may have a substantially triangular shape.

Returning to FIG. 10, the central body 110 of the mounting brace 100 may be substantially smooth. For example, the elongated surfaces 112 of the central body 110 may be substantially free from surface projections.

An example of a connection assembly 500 may include one or more brackets 505 (see e.g., FIG. 12) that may be used to support an electrical box 105. As described in more detail below, the illustrated connection assembly 500 may include two brackets 505 to support the electrical box 105 against the mounting brace 100.

As shown in FIGS. 12 to 15, the bracket 505 may include a body 510 with a front surface 511 and a rear surface 512. The body 510 may be formed with a substantially U-shape and including a first end 515 and a second end 520. The first end 515 and the second end 520 may be positioned proximate to one other at either end of the substantially U-shaped body 510. A channel 525 may be formed between the first and second ends 515, 520 and may extend partially along the length of the body 505 along a channel axis 527. In the illustrated example, the channel 525 may be substantially rectangular in shape, while other examples of the channel 525 may be other shapes (e.g., elliptical).

In some forms, a hanger opening 529 may be disposed through the body between the first and second ends 515, 520. For example, the hanger opening 529 may be positioned above the channel 525 and aligned with the channel axis 527.

In some forms, each end 515, 520 may include a foot 530. Each foot 530 may be angled relative to the respective end 515, 520 and may extend away from the rear surface 512. For example, each foot 530 may extend out of plane from the body 510 and be oriented at approximately a 90-degree angle with respect to the ends 515, 520. Each foot 530 may be substantially fixed relative to the respective end 515, 520. For example, a user may not be required to bend either foot 530 to install the bracket 505 (described in more detail below). The feet 530 may be bent to a desired location during a manufacturing process and a user may not need to further manipulate the position of either foot 530.

In some forms, the bracket 505 may include one or more tabs that assist in assembling the bracket 505 with the brace 100. The illustrated bracket 505 includes four tabs (described in detail below), although other examples of the bracket 505 may include a greater or lesser number of tabs. Each of the illustrated tabs extend from an edge of the bracket 505 that forms the channel 525. However, other examples of the bracket 505 may include tabs formed on other surfaces.

A first tab 535 may extend into the channel 525 in a direction substantially perpendicular to the channel axis 527. For example, the first tab 535 may be disposed in substantially the same plane as the body 510.

Figure 13:
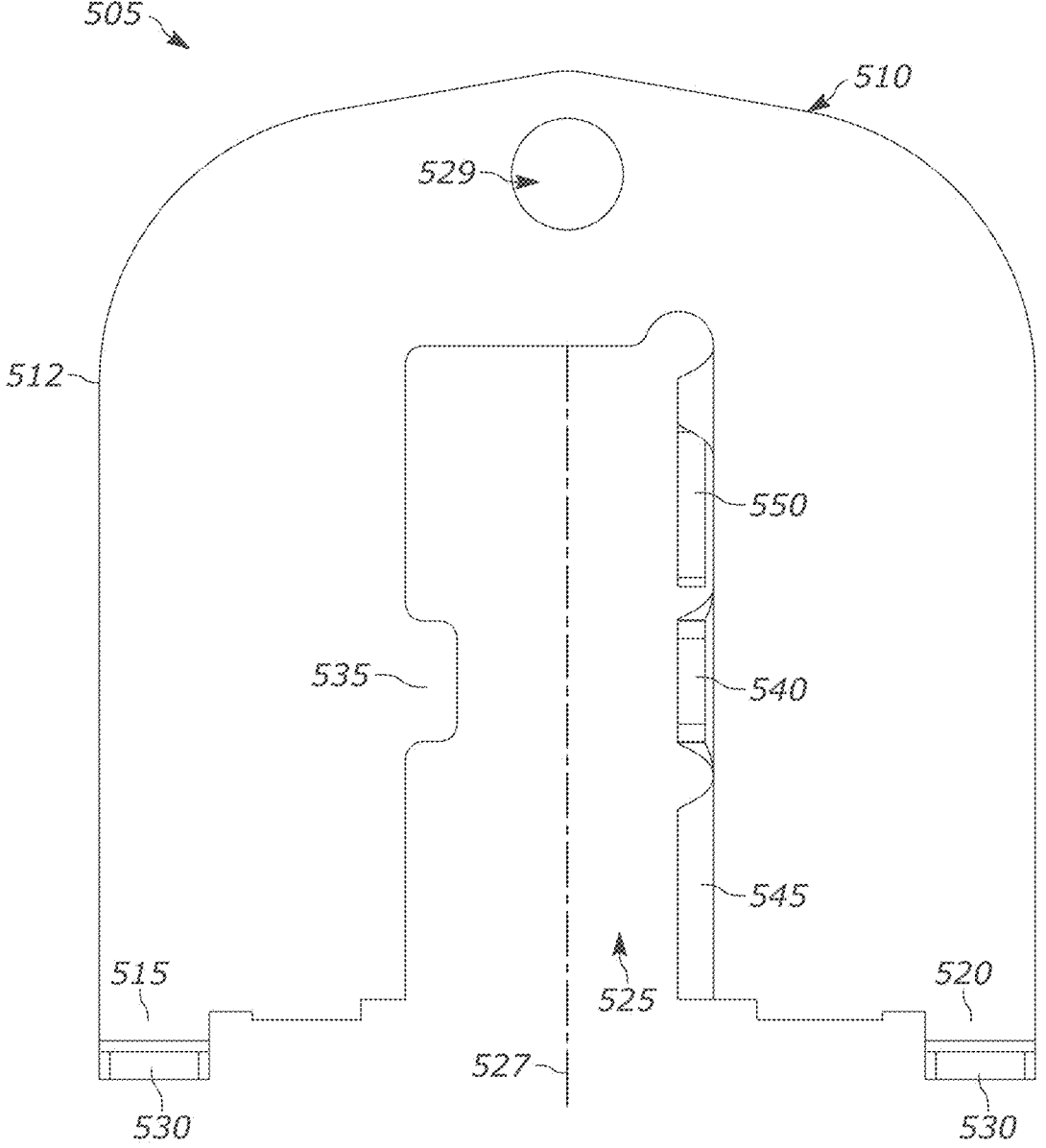
FIG. 13 shows a rear view of the bracket of FIG. 12.
Figure 14:
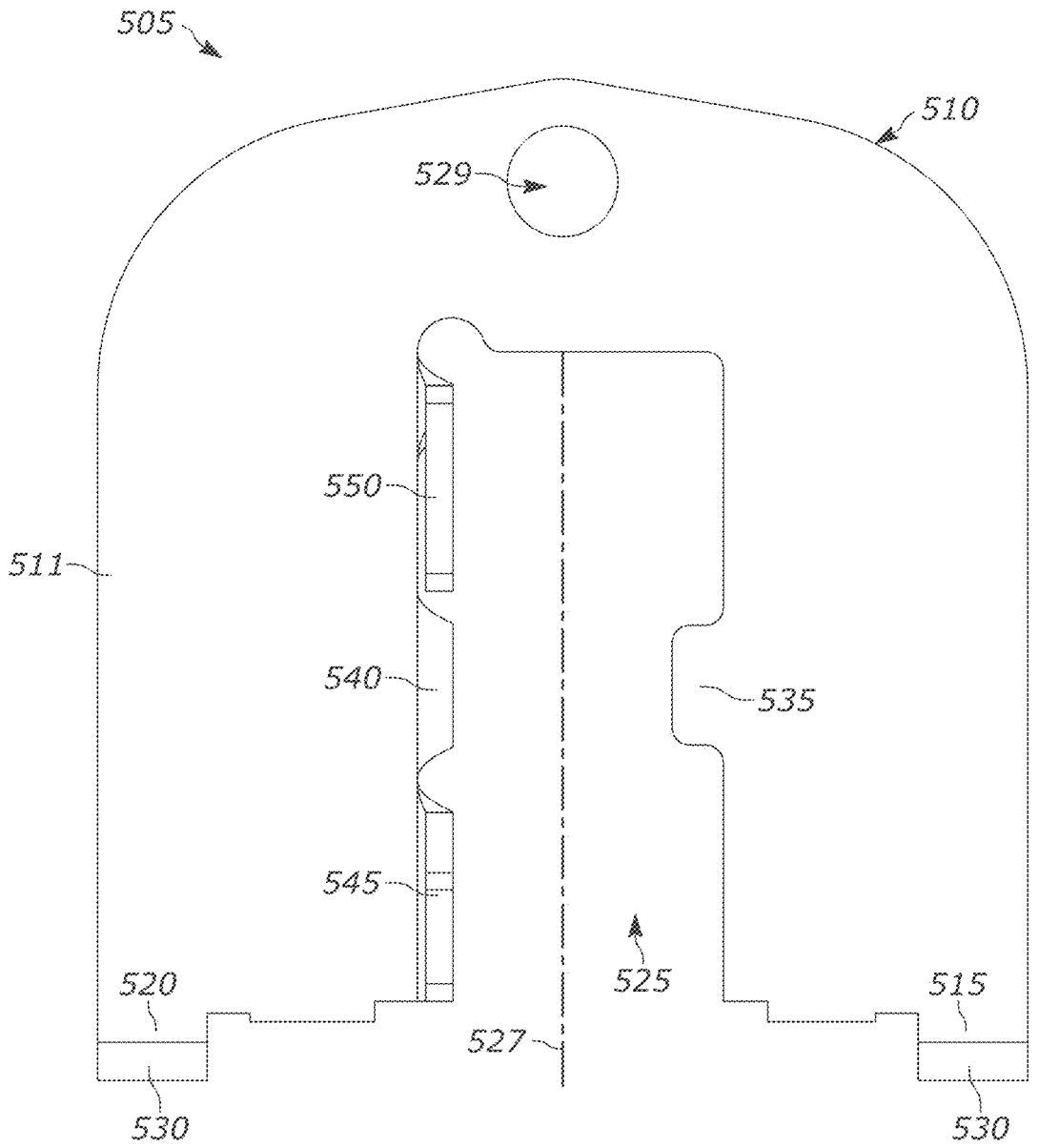
FIG. 14 shows a front view of the bracket of FIG. 12.

As illustrated in FIG. 13, the first tab 535 may include a substantially rectangular cross section and may extend toward a center of the channel 525 (e.g., both toward channel axis 527 and a midpoint of the channel 525). The first tab 535 may not extend entirely to the channel axis 527 such that the length of the first tab 535 is less than half the width of the channel 525. Although, in other examples, the first tab 535 may extend a greater or lesser distance across the channel 525.

Figure 12:
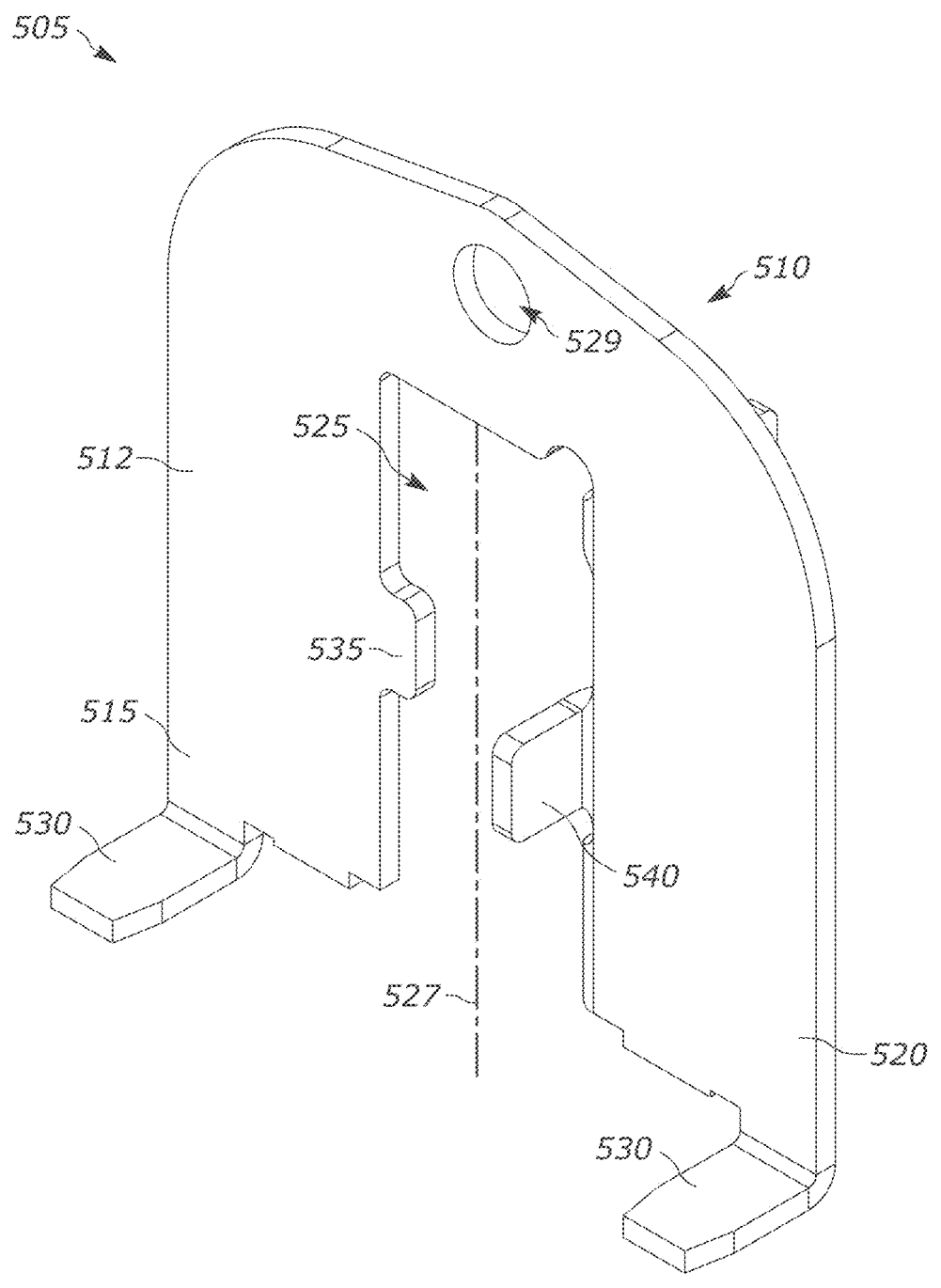
FIG. 12 shows a rear perspective view of a bracket for supporting the electrical box.

As shown in FIG. 12, a second tab 540 may be disposed substantially opposite the first tab 535 across the channel 525. Unlike the first tab 535, the second tab 540 may extend out of the channel 525 (e.g., instead of across the channel 525). The second tab 540 may be substantially perpendicular to both the first tab 535 and to the channel axis 527. In the illustrated example, the second tab 540 may extend in substantially the same direction as the feet 530 (e.g., visible when viewing the rear surface 512). However, in other examples, the second tab 540 may extend in another direction (e.g., opposite to the feet 530 or angled with respect to the feet 530). The second tab 540 may have a substantially rectangular shape, although other shapes may be used.

Figure 15:
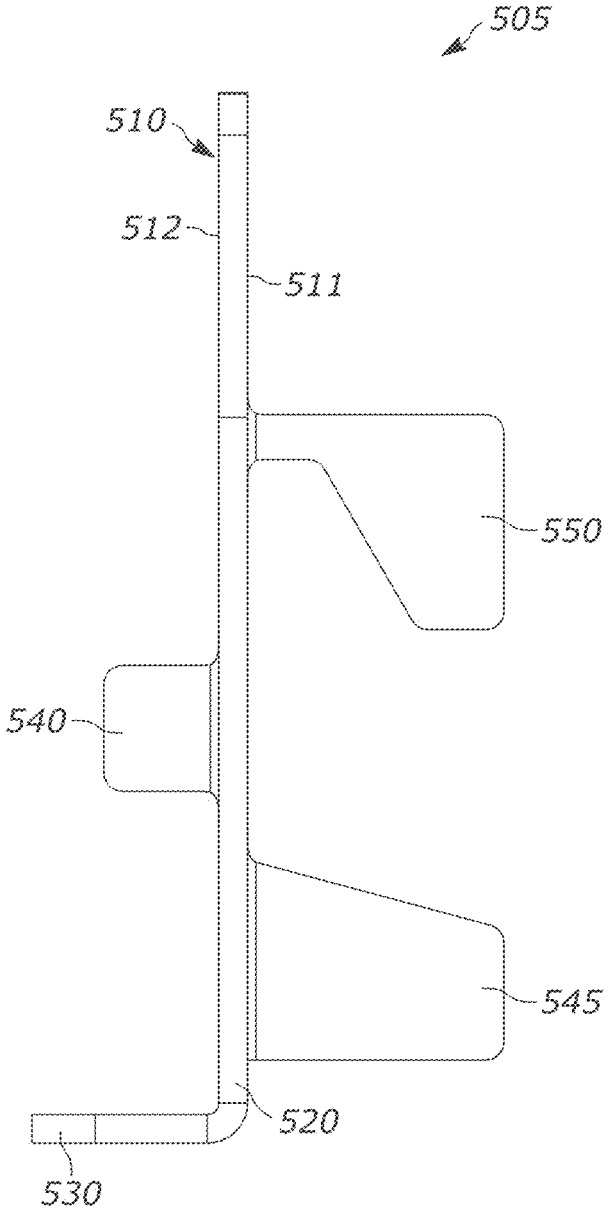
FIG. 15 shows a side view of the bracket of FIG. 12.

As shown in FIG. 15, a third tab 545 may extend from the channel 525. In the illustrated example, the third tab 545 may be disposed below the first and second tabs 535, 540 (e.g., proximate to the feet 530), although in other examples, the third tab 545 may be located within the channel 525 in a different orientation. The third tab 545 may be oriented substantially parallel to the second tab 540 so that it extends out of the plane of the body 510 in a direction substantially perpendicular to the channel axis 527. In the illustrated example, the third tab 545 may extend in an opposite direction than the second tab 540 (and the feet 530) so that it is visible when viewing the front surface 511. The illustrated third tab 545 has a substantially trapezoidal shape, although other examples may include other shapes (e.g., triangular, rectangular, etc.).

With continued reference to FIG. 15, a fourth tab 550 may also extend away from the channel 525. In the illustrated example, the fourth tab 550 may be disposed above the first and second tabs 535, 540 (e.g., distal to the feet 530), although in other examples, the fourth tab 550 may be located differently within the channel 525. The fourth tab 550 may be oriented substantially parallel to the second tab 540 so that it extends out of the plane of the body 510 in a direction substantially perpendicular to the channel axis 527. In the illustrated example, the fourth tab 550 may extend in an opposite direction than the second tab 540 (and the feet 530) so that it is visible when viewing the front surface 511. The illustrated fourth tab 550 has a substantially trapezoidal shape, although other examples may include other shapes (e.g., triangular, rectangular, etc.).

In some forms, the second, third, and fourth tabs 540, 545, 550 may be disposed on the same side of the channel 525. The second tab 540 may be disposed between the third and fourth tabs 545, 550 and oriented in the opposite direction as the third and fourth tabs 545, 550.

Figure 16:
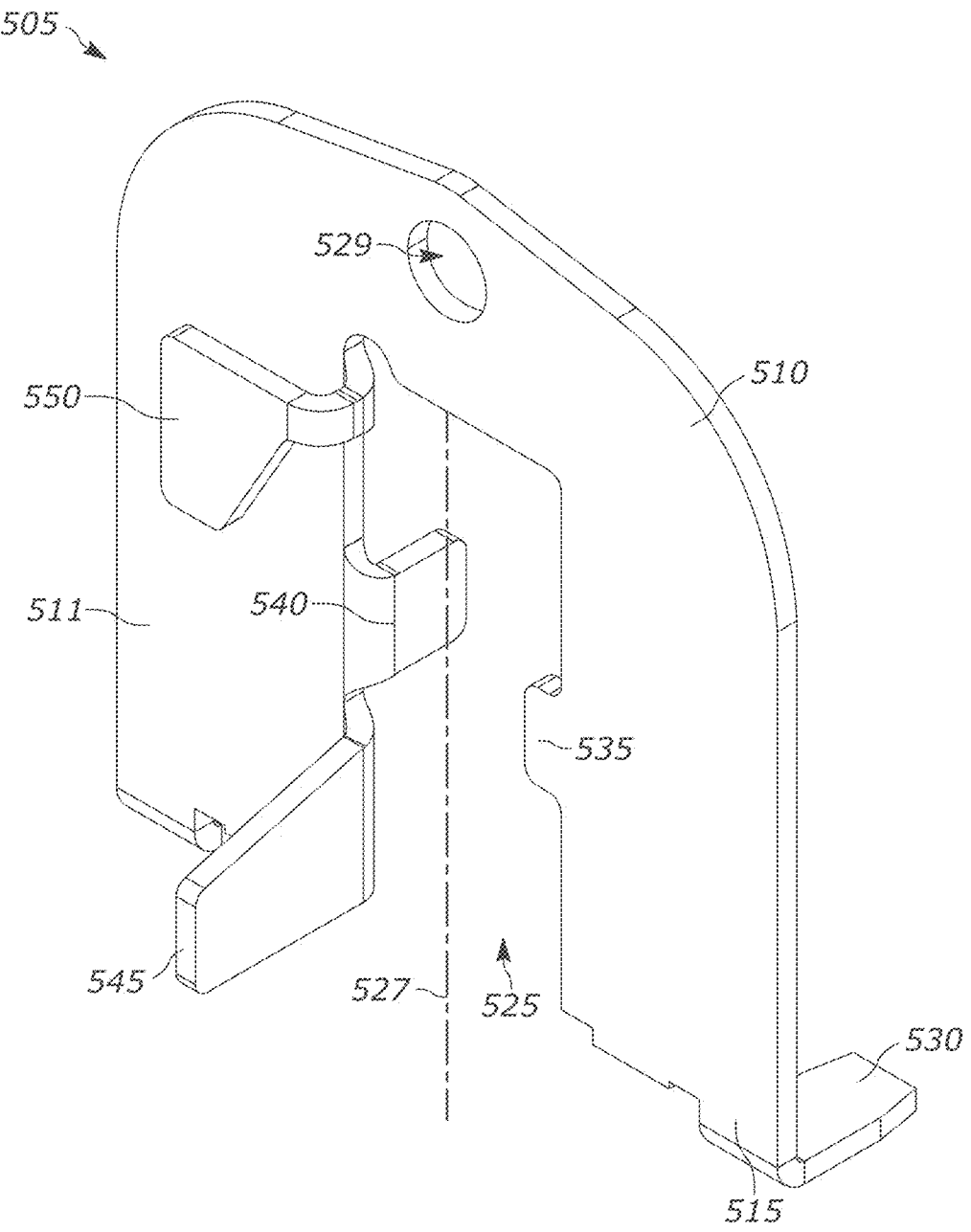
FIG. 16 shows a front view of the bracket of FIG. 12 with a tab moved to a second position.
Figure 17:
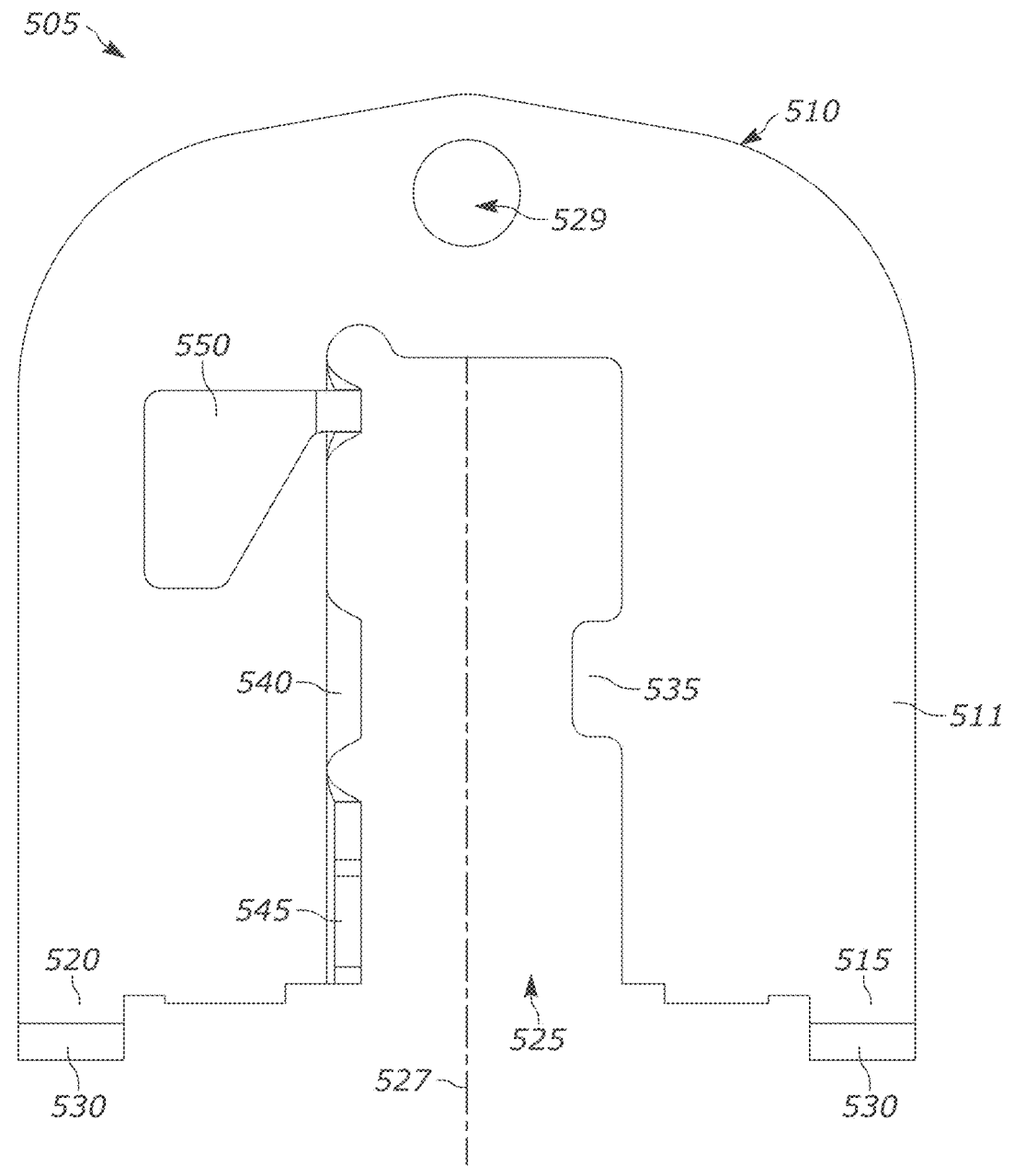
FIG. 17 is a front view of the bracket of FIG. 16.
Figure 18:
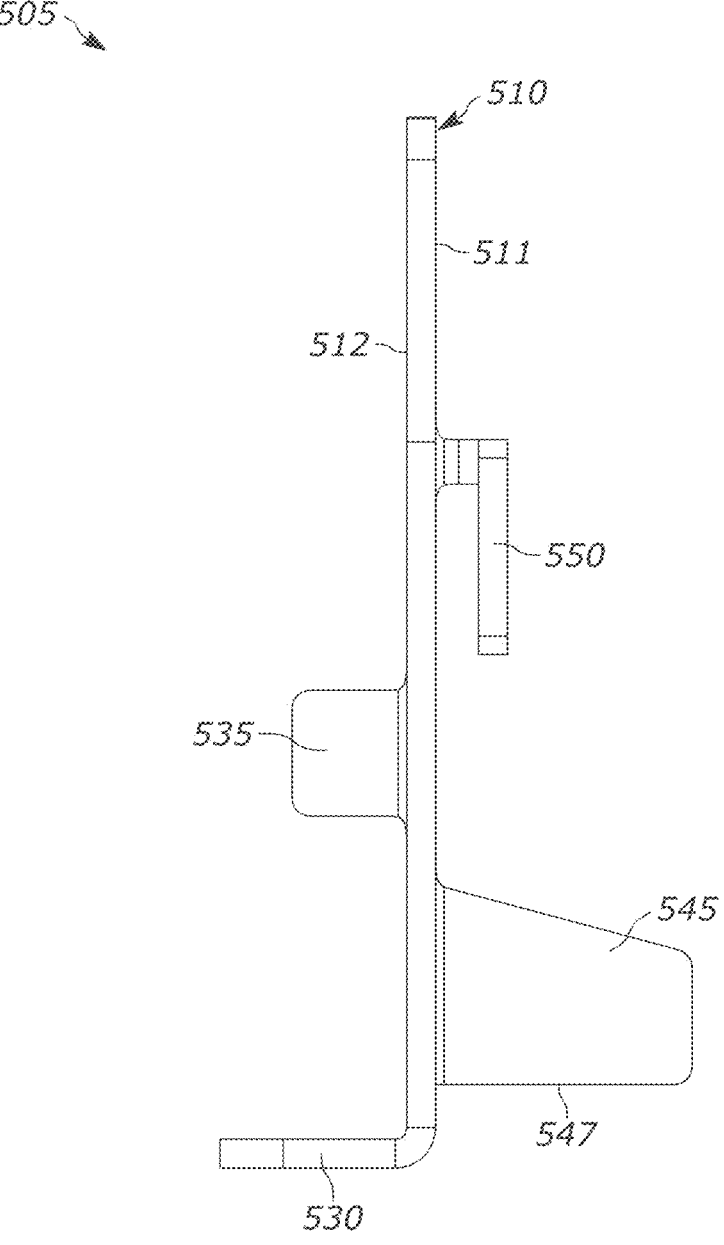
FIG. 18 is a side view of the bracket of FIG. 16.

As shown in FIGS. 16 to 18, the fourth tab 550 may be movable relative to the body 510. For example, the fourth tab 550 may be bendable so that it can move from being perpendicular relative to the first tab 530 to being parallel relative to the first tab 530. In the illustrated example, the fourth tab 550 may be bent away from the channel 525 so that it extends away from the channel 525.

In use, two brackets 505 may be used to form a connection assembly 500 which may be used to connect the electrical box 105 to the brace 100. As described above, each bracket 505 may be asymmetrical. As described in more detail below, each of the two brackets 505 may be the same style bracket (e.g., no right and left version). This may simplify tooling and manufacturing costs because only a single type of bracket needs to be manufactured.

Figure 19:
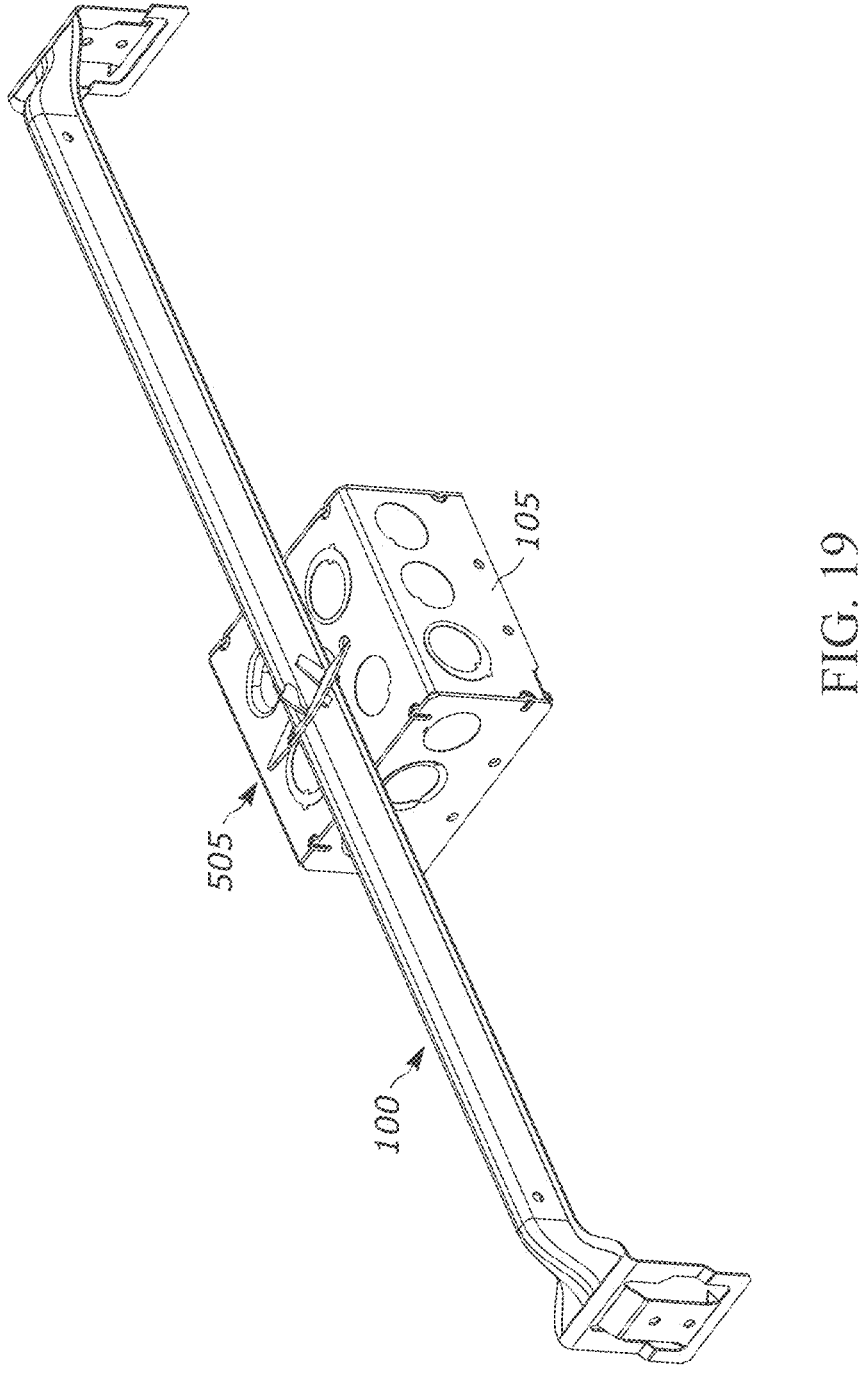
FIG. 19 is a perspective view of a first step of mounting the bracket of FIG. 12 to an electrical box and a mounting brace.
Figure 20:
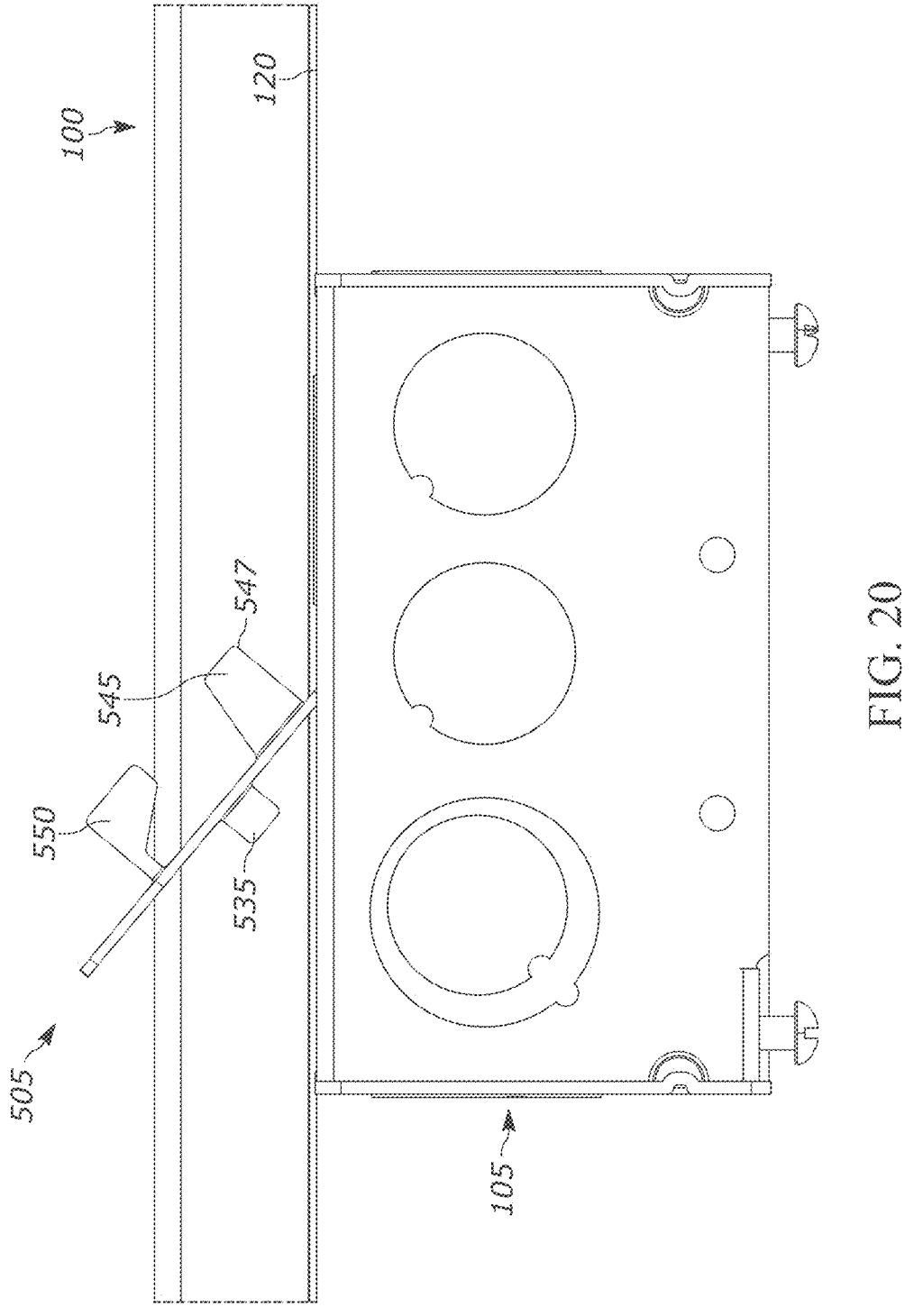
FIG. 20 is a detail of the first step of FIG. 19.
Figure 21:
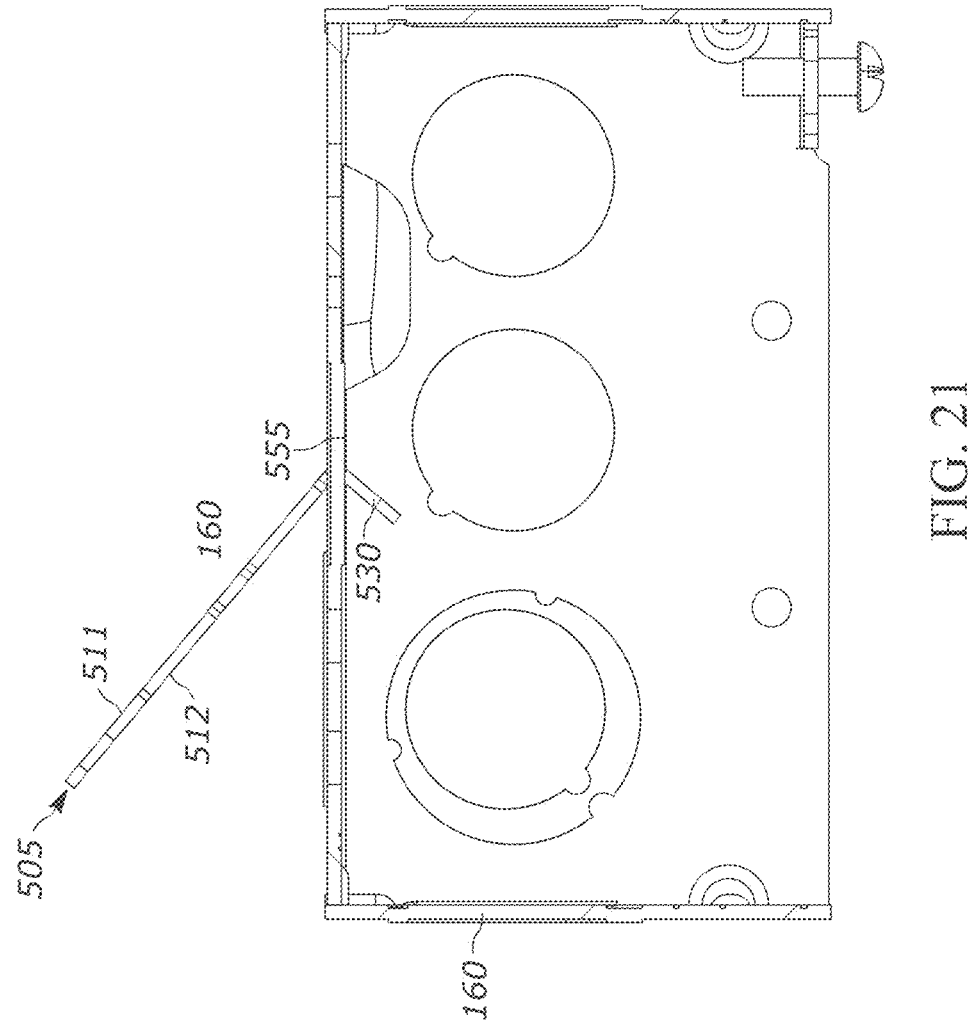
FIG. 21 is a cross sectional view of FIG. 19.

As shown in FIGS. 19 to 21, the brace 100 may be positioned against a top surface of the electrical box 105. The brace 100 may be positioned proximate to a center of the electrical box 105 so that it is positioned between mounting holes 555 of the electrical box 105. The mounting holes 555 may be pre-formed in the electrical box 105 (e.g., not knockouts 160) so that a user is not required to alter the electrical box 105. The electrical box 105 may positioned at any location along the brace 100 (e.g., not necessarily halfway between the connecting ends 115).

One bracket 505 may then be positioned so that the channel 525 receives the central body 110 of the brace 100. In the illustrated example, the bracket 505 is positioned so that it is angled relative to the surface of the electrical box 105. In this position, the rear surface 512 may be facing the upper surface of the electrical box 105. This orientation may permit each foot 530 to fit through the respective mounting hole 555.

Figure 22:
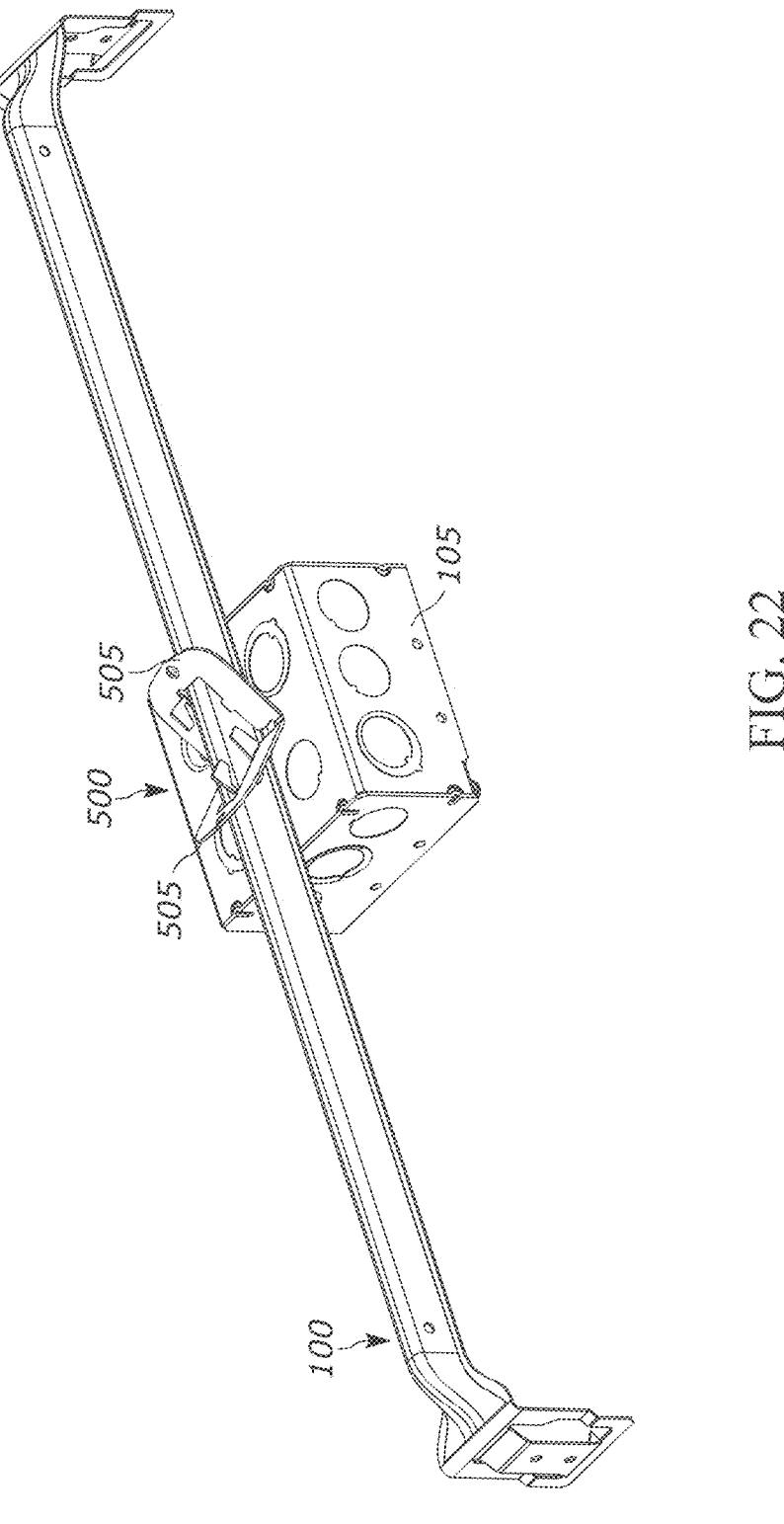
FIG. 22 is a perspective view of a second step of mounting the bracket of FIG. 12 to an electrical box and a mounting brace.
Figure 23:
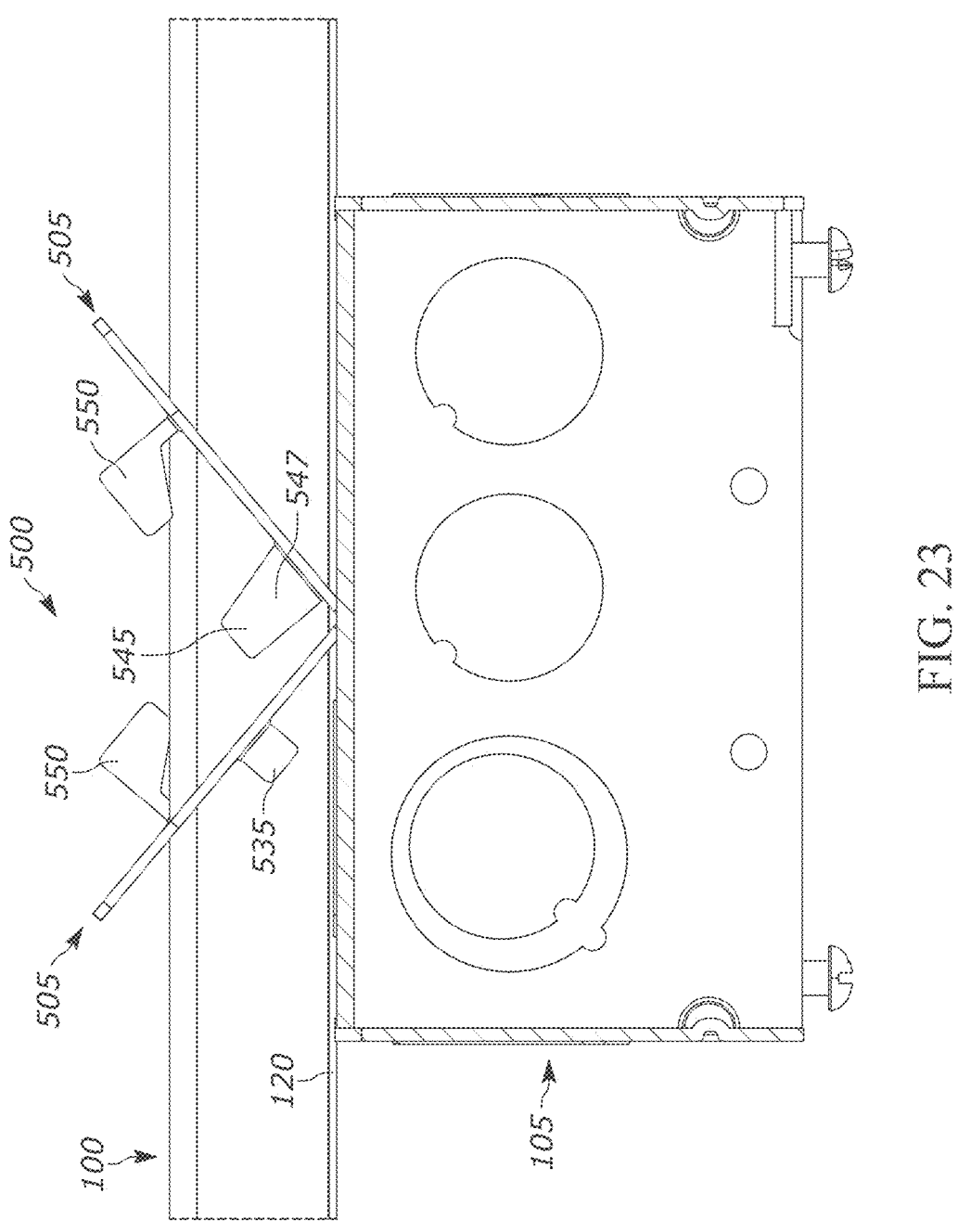
FIG. 23 is a detail view of the second step of FIG. 22.
Figure 24:
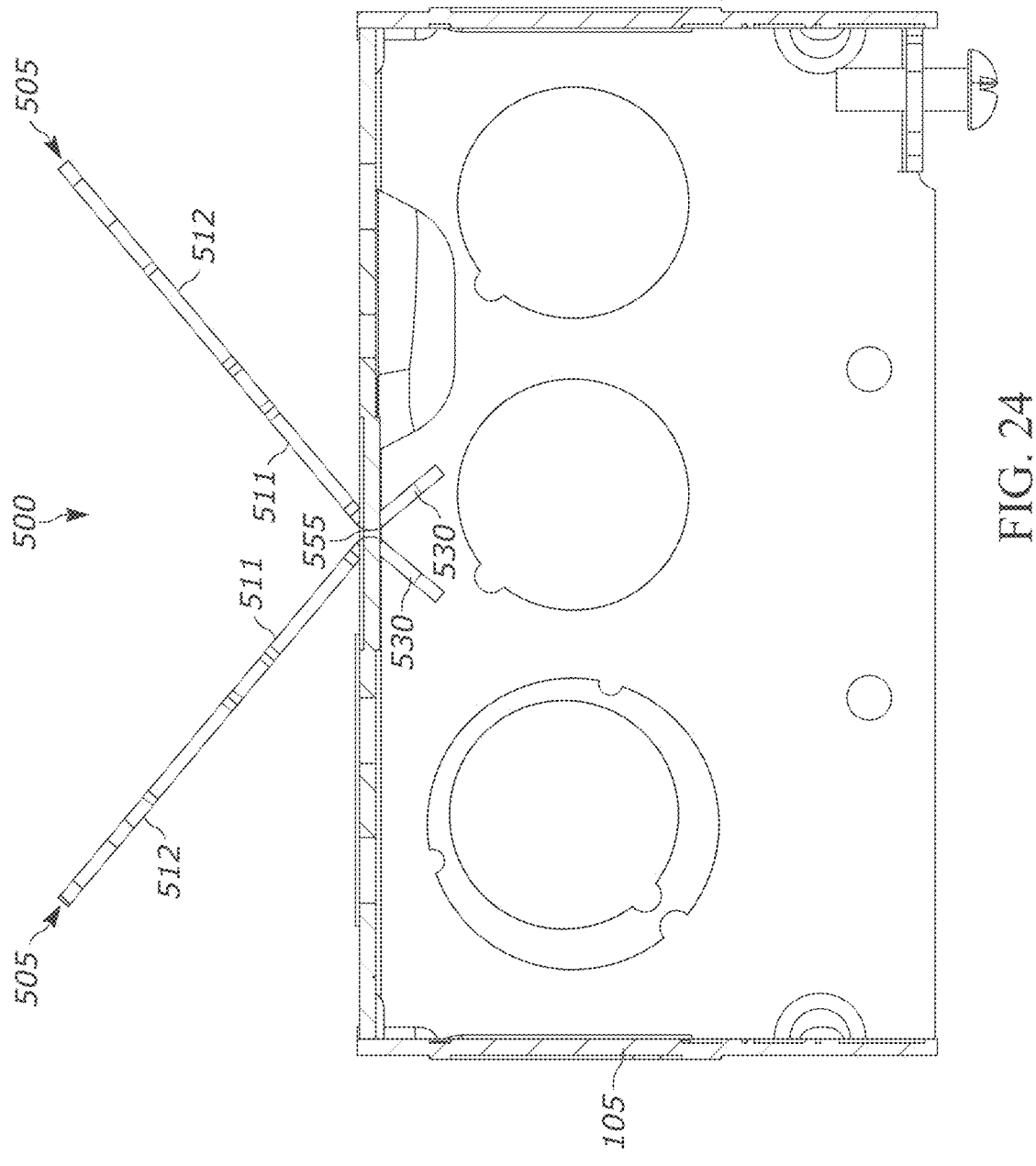
FIG. 24 is a cross sectional view of FIG. 22.
Figure 25:
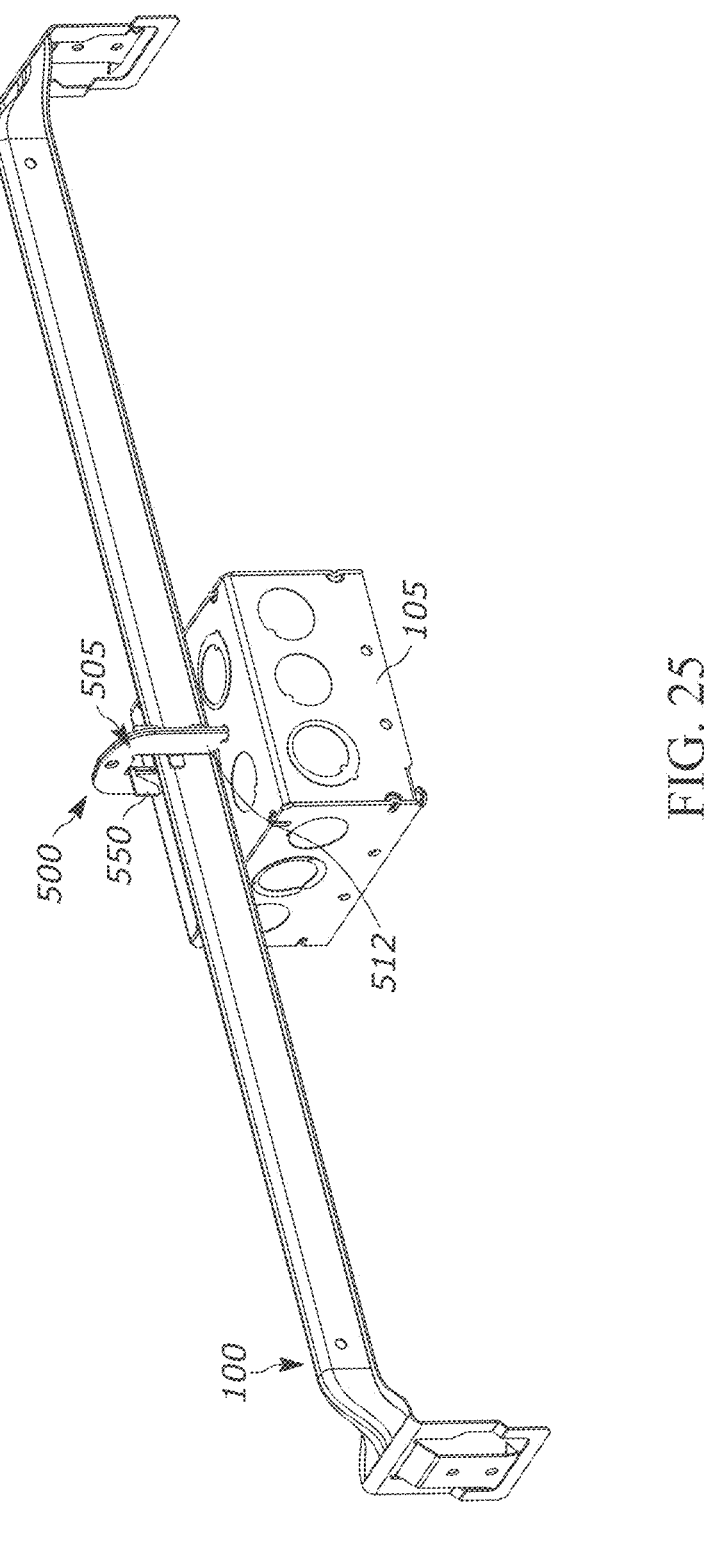
FIG. 25 is a perspective view of a third step of mounting the bracket of FIG. 12 to an electrical box and a mounting brace.
Figure 26:
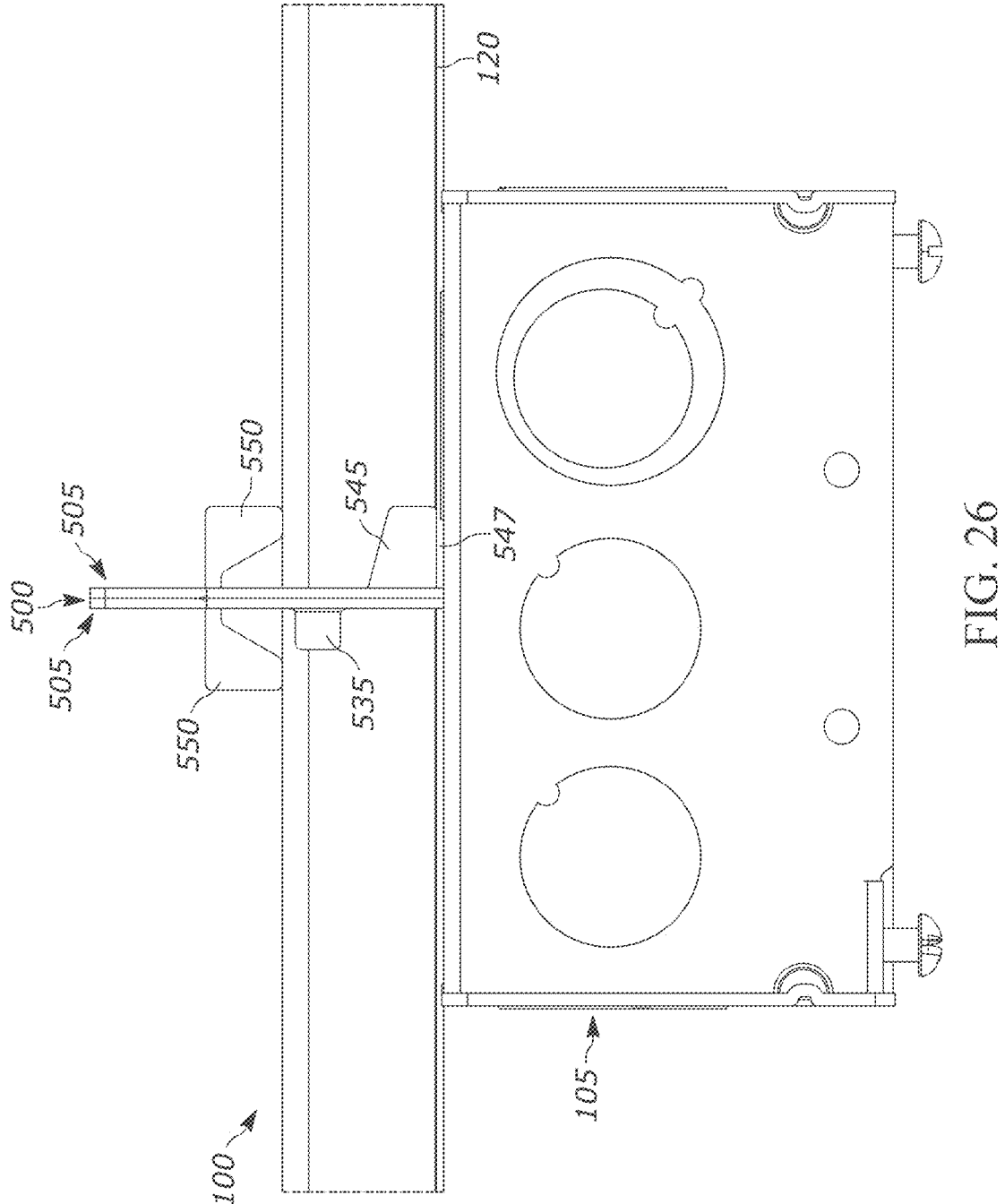
FIG. 26 is a detail view of the third step of FIG. 25.
Figure 27:
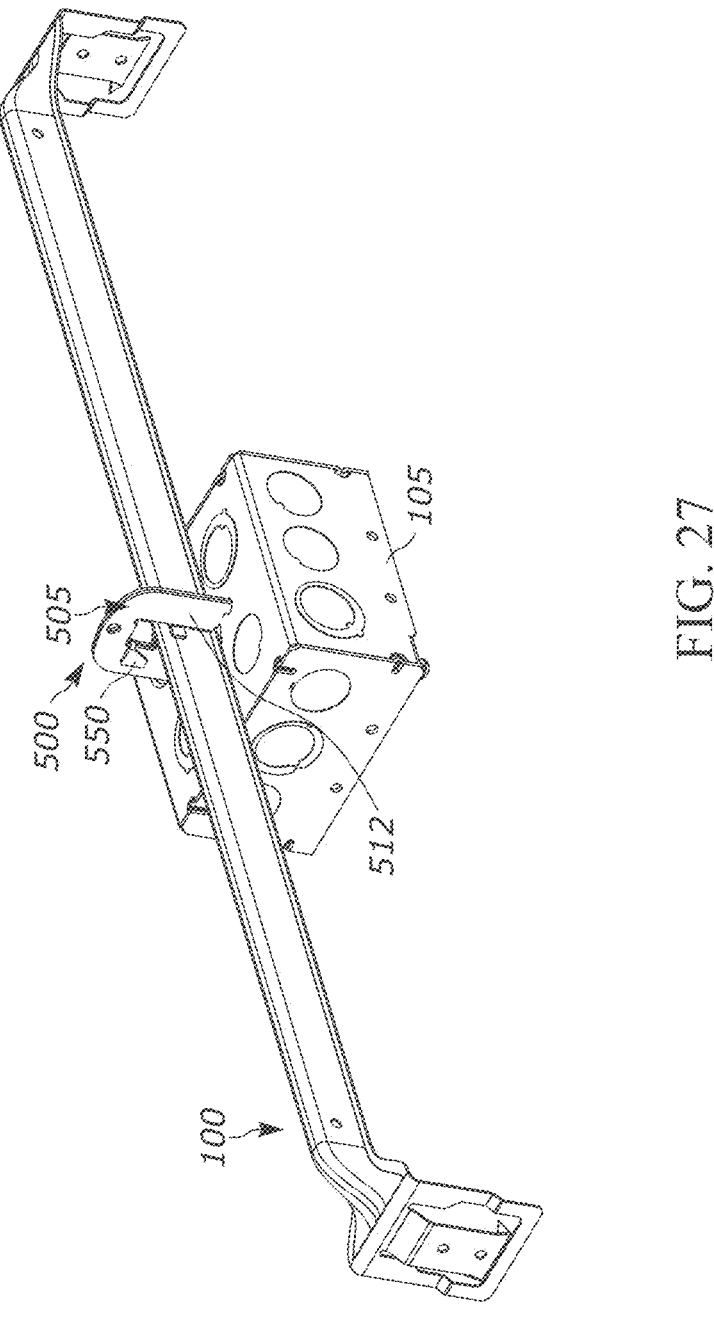
FIG. 27 is a perspective view of a fourth step of mounting the bracket of FIG. 12 to an electrical box and a mounting brace.
Figure 28:
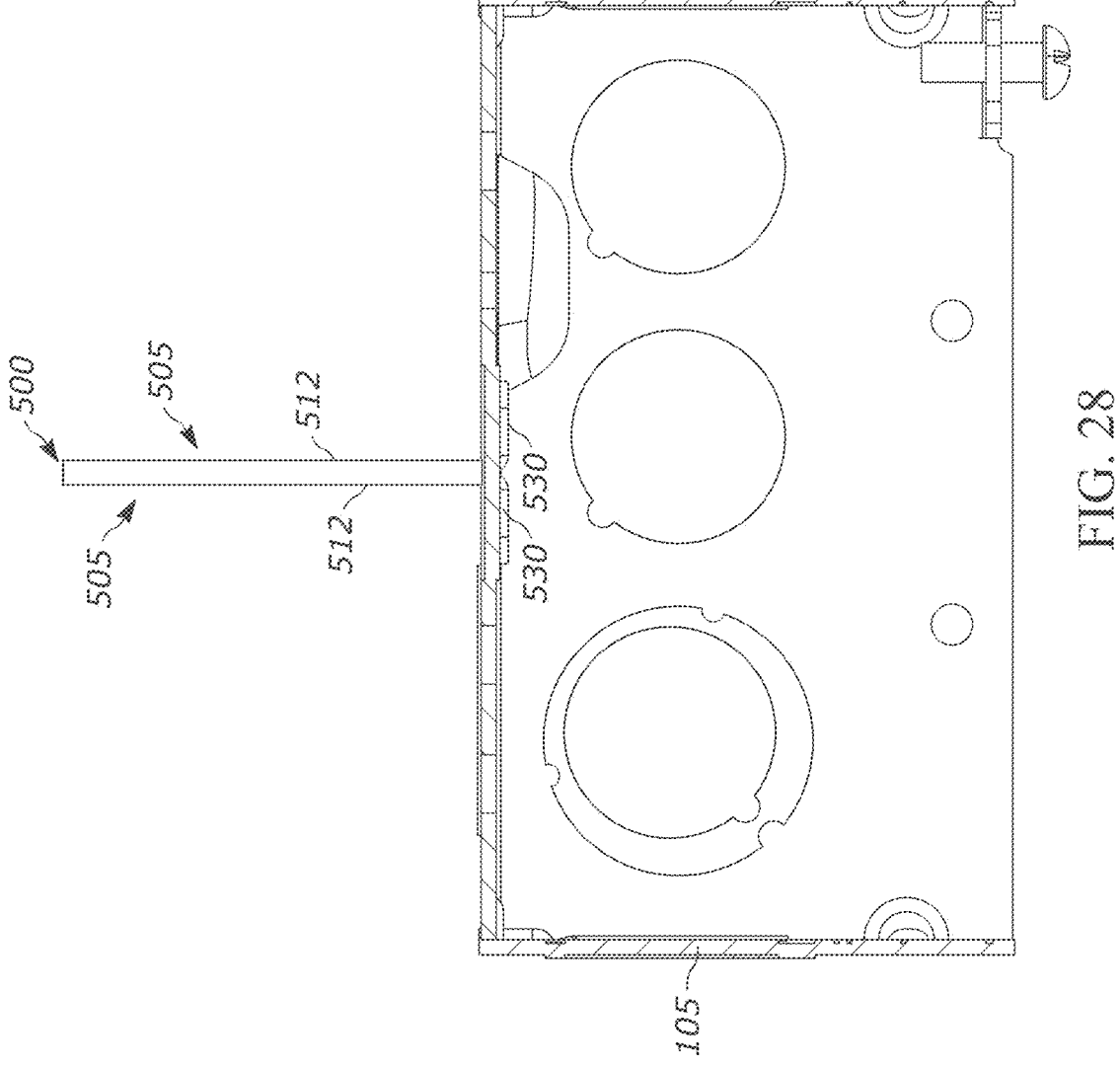
FIG. 28 is a cross sectional view of FIG. 27.

As shown in FIGS. 22 to 24, the other bracket 505 may be positioned so that its channel 525 receives the central body 110 of the brace 100. The bracket 505 may be oriented so that its feet 530 extend in the opposite direction as the feet 530 of the first bracket 505. The bracket 505 may then be angled relative to the surface of the electrical box 105 so that its feet 530 fit through mounting holes 555. In the illustrated example, each mounting hole 555 may receive a foot 530 from each bracket 505, although in other examples, each foot 530 may have its own mounting hole 555. Because the two brackets 505 are identical, they are not oriented to be mirrors of one another in this position (e.g., as a result of the brackets 505 being asymmetrical).

As shown in FIGS. 25 to 28, the brackets 505 may be pivoted toward one another. In the illustrated example, the front surfaces 511 of the brackets 505 may be brought into contact with one another. In this position, the brackets 505 may be substantially perpendicular with respect to the upper surface of the electrical box 105.

Once the brackets 505 are moved into the position illustrated in FIGS. 25 to 28, the fourth tab 550 on at least one of the brackets 505 may be moved relative to the respective body 510. For example, the fourth tab 550 on one bracket 505 may be bent away from the channel 525 toward the rear surface 512 of the other bracket 505. As described above, the final position of the fourth tab 550 may be perpendicular to both the channel axis 527 and to the third tab 545.

A user may bend the fourth tab 550 on both brackets 505 so that they are each in contact (or close proximity) to the rear surface 512 of the other bracket 505. The fourth tabs 550 may assist in limiting movement of the brackets 505 relative to one another. For example, once the fourth tabs 550 are moved into the position of FIG. 27, the brackets 505 may be prevented from returning to the position illustrated in FIGS. 21 to 24 and being removed from the electrical box 105.

The fourth tab 550 may remain in position after being bent to continue contacting the opposite bracket 505. In other words, the fourth tab 550 may not return to its initial position after a user releases a force.

Throughout the mounting process, a user may not be required to enter the electrical box 105. For example, only the feet 530 extend into the electrical box 105, and the user is otherwise not required to secure fasteners within the electrical box 105. This may improve assembly because a user is not required to interfere with the various electrical components housed within the box 105.

In some forms, the fourth tabs 550 may be able to bend multiple times without breaking (e.g., the fourth tabs 550 have high cycle fatigue). This may permit a user to return the fourth tabs 550 to the position illustrated in FIG. 25 and permit the brackets 505 to move relative to one another. A user may do this to replace the bracket 505 and/or service the electrical box 105 (or components housed in the box 105).

Returning to FIG. 1, the connecting ends 115 are connected to the ceiling supports 75 to support the mounting brace 100 above the ceiling. The connection between the respective connecting end 115 and ceiling support 75 may be made before or after the electrical box 105 is connected to the mounting brace 100 (e.g., via the brackets 505).

Figure 3:
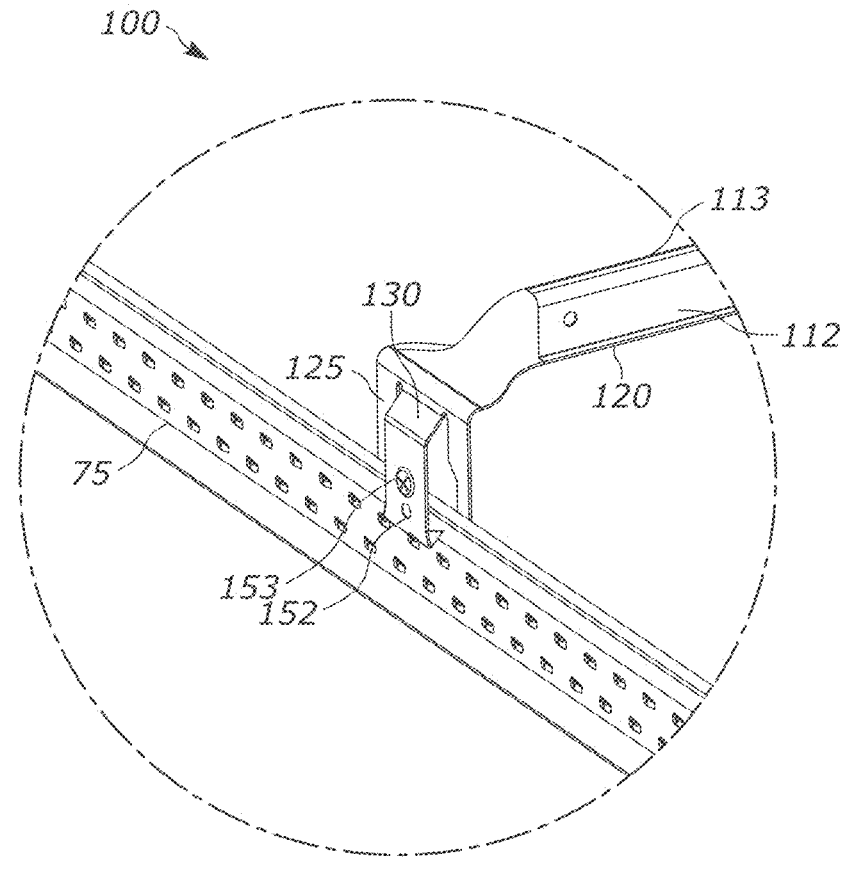
FIG. 3 shows a first detail view of the mounting brace of FIG. 1 connected to one of the ceiling supports.
Figure 4:
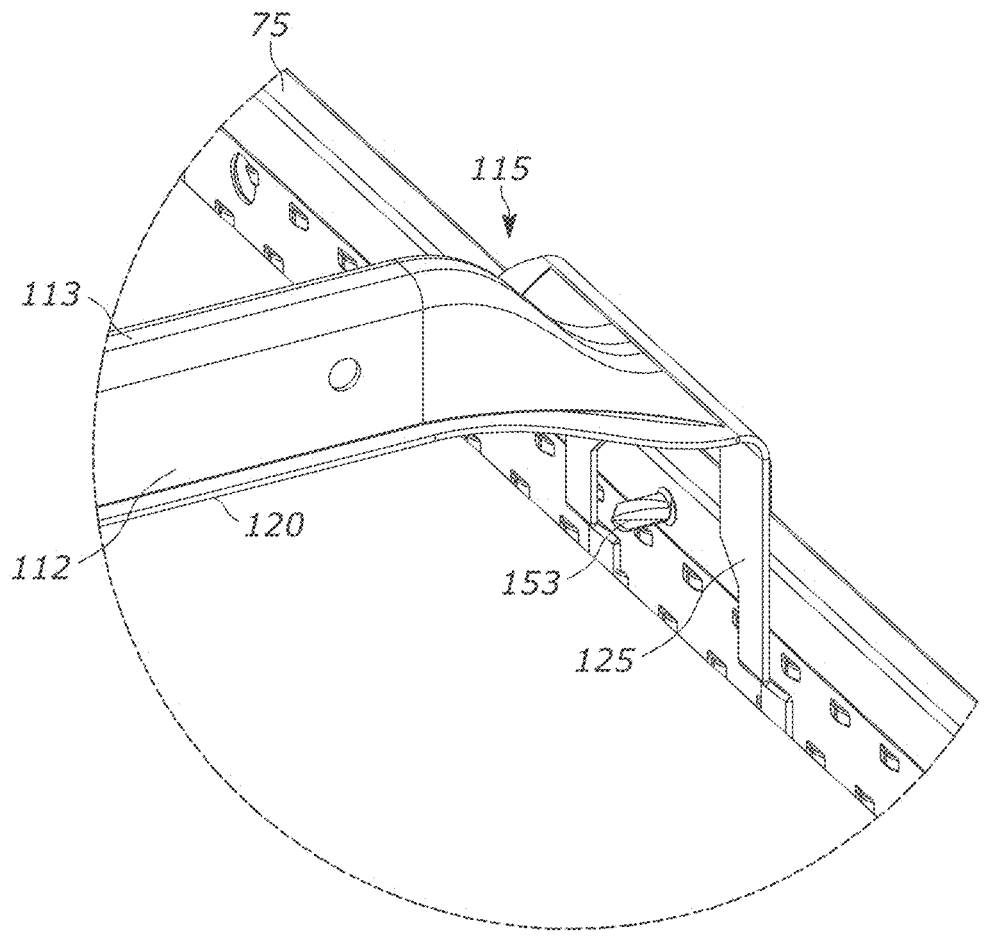
FIG. 4 shows a second detail view of the mounting brace of FIG. 1 connected to one of the ceiling supports.
Figure 5:
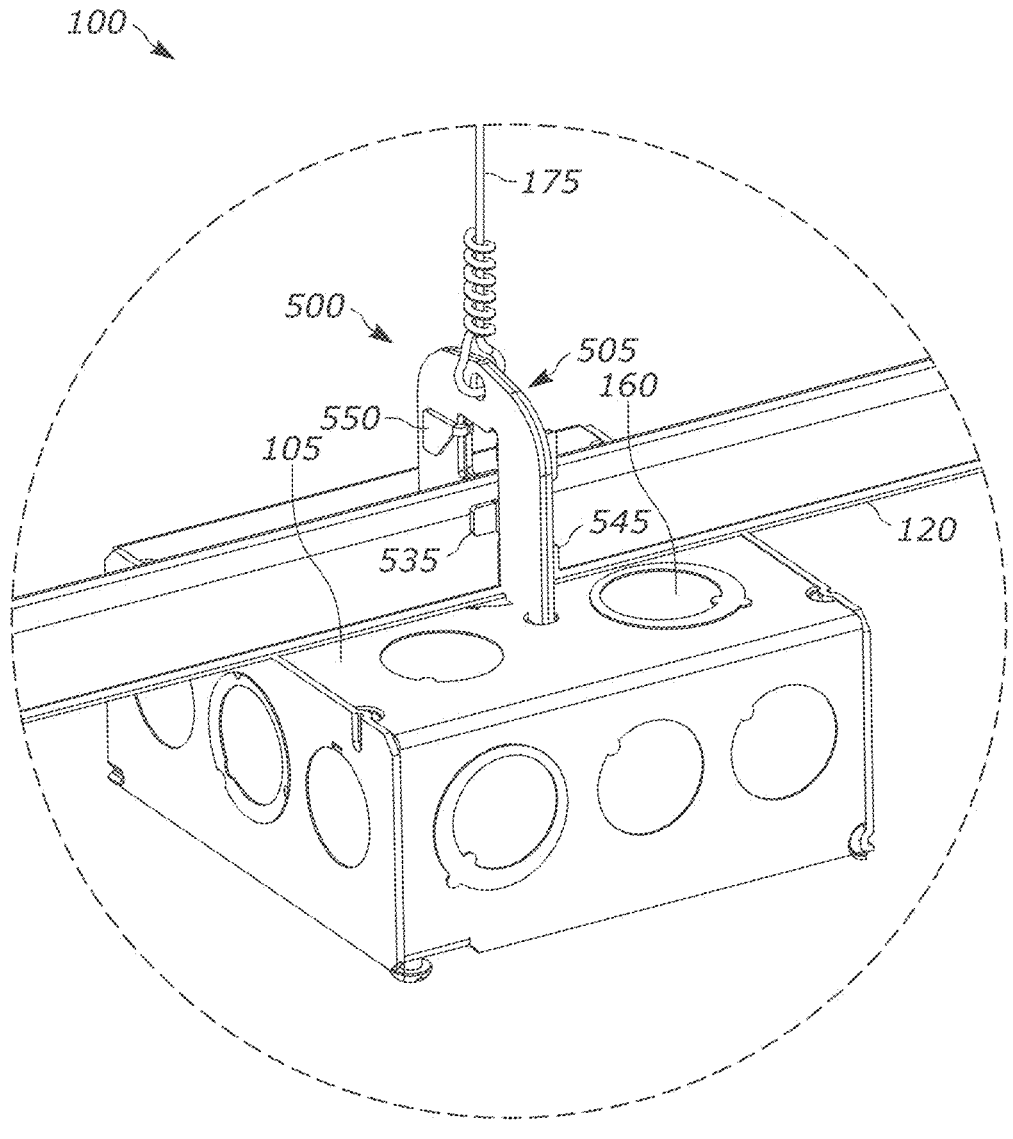
FIG. 5 shows a detail view of a cable supporting the mounting brace of FIG. 1 via the mounting bracket while connected to the ceiling supports.

As shown in FIGS. 3 and 4, the connecting end 115 is connected to the respective ceiling support 75 by positioning the outer section 125 and the inner section 130 on opposite sides of the ceiling support 75. The connecting end 115 may be connected above the ceiling support 75 so that gravity assists with retaining the mounting brace 100 to the ceiling supports 75.

In the illustrated example, the inner section 130 is positioned on an outside of the respective ceiling support 75 and the outer section 125 is positioned on the inner side of the respective ceiling support. The cantilevered inner section 130 can flex relative to the outer section 125 to be positioned on opposite sides of the ceiling support 75. This flexion may be assisted by the transition 145, which initially spaces the inner section 130 from the outer section 125 to require less relative movement.

The engaging elements 150 may contact the surface of the ceiling support 75 in use to limit inadvertent disengagement between the mounting brace 100 and the ceiling support 75.

The inner section 130 may include one or more mounting holes 152. A fastener (e.g., a threaded screw) 153 can be inserted through one of the mounting holes 152 and through the ceiling support 75 to secure the mounting brace 100 to the ceiling support 75.

Pivoting the brackets 505 into position from an angled orientation to a perpendicular orientation (e.g., see movement illustrated in FIGS. 19 to 28) permits the connection between the electrical box 105 and the brackets 505 without any fasteners. For example, the feet 530 are receivable within the mounting holes 555 by orienting the brackets 505 in the above-described position (see e.g., FIGS. 19 to 21). Pivoting the brackets 505 into the position illustrated in FIGS. 25 to 28 hooks the brackets 505 around the electrical box 105 and limits relative movement between the brackets 505 and the box 105. For example, the feet 530 limit the electrical box 105 from moving away from the brackets 505 because the feet are in contact with an inner surface of the electrical box 105. The width of the first and second ends 515, 520 is also greater than a width of the mounting holes 555, which limits the electrical box 105 from moving along the channel axis 527 toward the hanger opening 529.

Once the mounting brace 100 is connected to the ceiling supports 75, the brackets 505 may support the electrical box 105 against the force of gravity without any further fasteners. For example, the feet 530 of the brackets 505 (e.g., four feet 530 in total) support the weight of the electrical box 105. An inner surface of the electrical box 105 contacts and is supported by the feet 530. The feet 530 may be stiff to limit any flexing because of the weight of the electrical box 105, which maintains the electrical box 105 at a consistent position.

The first, second, and third tabs 535, 540, 545 may be used to support the mounting brace 100 relative to the brackets 505. The first tab 535 is directed toward a center of the channel 525, and each first tab 535 may be in contact (or in close proximity) with the mounting brace 100. For example, each first tab 535 may contact an elongated surface 112 of the mounting brace 100. The first tab 535 may be oriented into the mounting brace 100 (e.g., perpendicular to the elongated surface 112). Additionally, the second and third tabs 540, 545 may be in contact (or in close proximity) with the mounting brace 100. The second and third tabs 540, 545 may be oriented parallel to the elongated surface 112.

For example, the third tabs 540 may be positioned proximate to the elongated surface 112 of the mounting brace 100. When the connection assembly 500 is fully assembled, the mounting brace 100 may be disposed between the third tabs 540. The third tabs 540 may limit lateral movement of the mounting brace 100 relative to the connection assembly 500.

The fourth tab 545 may contact the rail 120 and provide a clamping force. For example, as each bracket 505 pivots toward the position illustrated in FIGS. 25 to 28, a lower edge 547 of each fourth tab 545 comes in contact with the rail 120. A distance between the lower edge 547 and a top of the feet 530 may be approximately the distance between the electrical box 105 and the rail 120 when the rail 120 is disposed on the surface of the electrical box 105 (e.g., may be a slightly smaller distance). As the feet 530 hook within the electrical box 105, the fourth tab 545 create a positive action against mounting brace 100 as it is brought into contact with the rail 120. This force increases as each bracket 505 is pivoted toward the mounting position and a greater portion of the lower edge 547 contacts the respective rail 120. Because the distance between the top of the foot 530 and the lower edge 547 is substantially the same as the distance between an inner face of the electrical box 105 and an upper face of the rail 120, the lower edge 547 provides a clamping force and limits vertical movement of the electrical box 105 relative to the brace 100. In other words, each rail 120 may be sandwiched between the surface of the electrical box 105 and the brackets 505 by the fourth tabs 545 and the feet 530.

The mounting brace 100 may be similarly positioning or sandwiched between the fourth tabs 545. The fourth tabs 545 limit lateral movement of the mounting brace 100 relative to the connection assembly 500.

These tabs 535, 540, 545 may limit relative movement between the brackets 505 and the mounting brace 100. For example, the brackets 505 may be unable to rotate relative to the mounting brace 100 around the channel axis 527. The contact between the two brackets 505 in the position illustrated in FIGS. 25 to 28 may similarly limit relative rotation between the electrical box 105 and the brackets 505. The tabs 535, 540, 545 therefore may limit relative rotation between the mounting brace 100 and the electrical box 105. This may help to ensure that an orientation of the electrical box 105 does not shift once the mounting brace 100 is secured to the ceiling supports 75.

Additionally, the user may not be required to rotate or manipulate the electrical box 105 when mounting the electrical box 105 to the brace 100. This may make assembly and installation easier as it simplifies the necessary steps to connect the box 105 to the brace 100.

The tabs 535, 540, 545 may not limit relative movement along an axis of the central body 110 (e.g., in a direction perpendicular to the channel axis 527). The tabs 535, 540, 545 may support the brackets 505 to slide along the length of the central body 110 to permit the positional adjustment of the electrical box 105. For example, the above-described clamping force from the fourth tabs 545 may not prevent sliding movement. The clamping force from the fourth tabs 545 may limiting inadvertent movement but a force applied by the user may exceed the clamping force and permit sliding movement.

A cable may be inserted through the hanger opening 529 to provide additional support for the electrical box 105. For example, the cable may relieve some pressure on the feet 530 to assist the feet 530 in supporting the weight of the electrical box 105 (and any components housed inside).

In some forms, the electrical box 105 may come preassembled with the internal electrical components. In other words, a user may not be required to assemble various components before mounting the brace 100. This may be beneficial because it simplifies assembly and does not require the user to enter the electrical box 105.

One of ordinary skill will appreciate that the exact dimensions and materials are not critical to the disclosure and all suitable variations should be deemed to be within the scope of the disclosure if deemed suitable for carrying out the objects of the disclosure.

One of ordinary skill in the art will also readily appreciate that it is well within the ability of the ordinarily skilled artisan to modify one or more of the constituent parts for carrying out the various examples of the disclosure. Once armed with the present specification, routine experimentation is all that is needed to determine adjustments and modifications that will carry out the present disclosure.

The above examples are for illustrative purposes and are not intended to limit the scope of the disclosure or the adaptation of the features described herein. Those skilled in the art will also appreciate that various adaptations and modifications of the above-described preferred examples can be configured without departing from the scope and spirit of the disclosure. Therefore, it is to be understood that, within the scope of the appended claims, the invention may be practiced other than as specifically described.

What is claimed is:

1. A bracket for mounting an electrical box to a brace, the bracket comprising:
   a body portion including a first end with a first edge, a second end with a second edge, and a channel disposed in a channel plane between the first end and the second end and extending along a channel axis located in the channel plane, wherein the channel axis extends in a direction that is substantially perpendicular to a direction along which the first edge extends and to a direction along which the second edge extends;
   a first foot extending from the first edge in a direction substantially perpendicular to the channel plane;
   a second foot extending from the second edge in a direction substantially perpendicular to the channel plane; and
   a first tab formed as a cantilever member with a fixed end, connected to a first channel edge perpendicular to the first edge, and a free end, the first tab extending from the channel in a first tab direction substantially perpendicular to the channel plane;
   wherein the first tab is bendable to a second tab direction where the first tab is located outside of the channel, the second tab direction—is substantially perpendicular to the first tab direction and to the channel axis; and
   wherein the body portion is substantially U-shaped, and wherein the first edge and the second edge are collinear.

2. The bracket of claim 1, further comprising a second tab extending from the channel in a direction substantially parallel to the first tab direction.

3. The bracket of claim 1, further comprising a second tab extending toward a center of the channel in a direction substantially perpendicular to the channel axis.

4. The bracket of claim 1, further comprising:
   a second tab extending toward a center of the channel in a direction substantially perpendicular to the channel axis;
   a third tab extending from the channel in a direction substantially parallel to the first tab direction; and
   a fourth tab extending from the channel in a direction substantially parallel to and opposite from the third tab.

5. The bracket of claim 4, wherein the second tab extends from a second channel edge that is parallel to the first channel edge.

6. The bracket of claim 1, wherein the body portion includes an opening with a center along the channel axis, the opening configured to receive a hanger to support the bracket.

7. The bracket of claim 1, wherein the first foot extends in a first foot direction and the second foot extends in the first foot direction.

8. The bracket of claim 1, wherein the body portion is substantially U-shaped, wherein the channel has a rectangular shape with an open perimeter that is formed by the first channel edge, a second channel edge parallel to the first channel edge, and a back edge perpendicular to the first channel edge and the second channel edge.

9. A bracket for mounting an electrical box to a brace, the bracket comprising:

a body portion including a first end, a second end, and a channel disposed between the first end and the second end and extending along a channel axis;

a first foot extending from the first end in a direction substantially perpendicular to the channel axis;

a second foot extending from the second end in a direction substantially perpendicular to the channel axis;

a first tab extending from the channel in a first tab direction substantially perpendicular to the channel axis;

a second tab extending toward a center of the channel in a direction substantially perpendicular to the channel axis;

a third tab extending from the channel in a direction substantially parallel to the first tab direction; and a fourth tab extending from the channel in a direction substantially parallel to and opposite from the third tab;

wherein the first tab is bendable to a second tab direction that is substantially perpendicular to the first tab direction and to the channel axis; and wherein the first tab, the third tab, and the fourth tab are each formed as a cantilever member each having a fixed end and a free end, wherein the fixed end of each of the first tab, the third tab, and the fourth tab are connected to a first channel edge, and wherein the first channel edge is parallel to the channel axis.

10. The bracket of claim 9, wherein the body portion is substantially U-shaped, wherein the channel has a rectangular shape with an open perimeter that is formed by the first channel edge, a second channel edge parallel to the first channel edge, and a back edge perpendicular to the first channel edge and the second channel edge.

11. The bracket of claim 9, wherein the second tab extends from a second channel edge parallel to the first channel edge.

12. The bracket of claim 9, wherein the first foot extends in a first foot direction and the second foot extends in the first tab direction.

13. The bracket of claim 9, wherein a hanger opening extends through the body and is oriented along the channel axis.

14. The bracket of claim 9, wherein the body portion is substantially U-shaped.

15. A bracket for mounting an electrical box to a brace, the bracket comprising:

a body portion including a first end with a first edge, a second end with a second edge, and a channel disposed in a channel plane between the first end and the second end and extending along a channel axis located in the channel plane, wherein the channel axis extends in a direction that is substantially perpendicular to a direction along which the first edge extends and to a direction along which the second edge extends;

a first foot extending from the first edge in a direction substantially perpendicular to the channel plane;

a second foot extending from the second edge in a direction substantially perpendicular to the channel plane; and a first tab formed as a cantilever member with a fixed end, connected to a first channel edge perpendicular to the first edge, and a free end, the first tab extending from the channel in a first tab direction substantially perpendicular to the channel plane;

wherein the first tab is bendable to a second tab direction where the first tab is located outside of the channel, the second tab direction—is substantially perpendicular to the first tab direction and to the channel axis; and wherein the body portion is substantially U-shaped, wherein the channel has a rectangular shape with an open perimeter that is formed by the first channel edge, a second channel edge parallel to the first channel edge, and a back edge perpendicular to the first channel edge and the second channel edge.

16. The bracket of claim 15, further comprising:

a second tab extending toward a center of the channel in a direction substantially perpendicular to the channel axis;

a third tab extending from the channel in a direction substantially parallel to the first tab direction; and a fourth tab extending from the channel in a direction substantially parallel to and opposite from the third tab.

17. The bracket of claim 15, wherein the first foot extends in a first foot direction and the second foot extends in the first foot direction.

18. The bracket of claim 15, wherein the body portion includes an opening with a center along the channel axis, the opening configured to receive a hanger to support the bracket.

19. The bracket of claim 15, further comprising a second tab extending from the channel in a direction substantially parallel to the first tab direction.

* * * * *